United States Patent
Ando et al.

(10) Patent No.: US 7,971,668 B2
(45) Date of Patent: Jul. 5, 2011

(54) HYBRID VEHICLE AND CONTROL METHOD OF THE SAME

(75) Inventors: Daigo Ando, Nisshin (JP); Toshio Inoue, Gotenba (JP); Mamoru Tomatsuri, Toyota (JP); Keiko Hasegawa, Toyota (JP); Shunsuke Fushiki, Susono (JP); Tsukasa Abe, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 559 days.

(21) Appl. No.: 12/087,540

(22) PCT Filed: Dec. 11, 2006

(86) PCT No.: PCT/JP2006/324656
§ 371 (c)(1),
(2), (4) Date: Jul. 9, 2008

(87) PCT Pub. No.: WO2007/080729
PCT Pub. Date: Jul. 19, 2007

(65) Prior Publication Data
US 2009/0159351 A1 Jun. 25, 2009

(30) Foreign Application Priority Data

Jan. 13, 2006 (JP) .................................. 2006-006236

(51) Int. Cl.
*B60W 20/00* (2006.01)
(52) U.S. Cl. .................... 180/65.265; 903/930
(58) Field of Classification Search .................. 180/243, 180/65.21, 65.22, 65.25, 65.265, 65.28, 65.285; 903/930; 701/22, 70; 477/3
See application file for complete search history.

(56) References Cited

U.S. PATENT DOCUMENTS

| 5,650,713 A | 7/1997 | Takeuchi et al. |
| 6,093,974 A * | 7/2000 | Tabata et al. .............. 290/40 R |
| 6,307,277 B1 * | 10/2001 | Tamai et al. ............... 290/40 C |
| 6,569,055 B2 * | 5/2003 | Urasawa et al. .................. 477/5 |
| 6,752,225 B2 * | 6/2004 | Kojima ..................... 180/65.25 |
| 6,949,897 B2 * | 9/2005 | Wakashiro et al. ........... 318/139 |
| 7,077,223 B2 * | 7/2006 | Kubodera et al. ........ 180/65.225 |
| 7,152,395 B2 * | 12/2006 | Inoue et al. ..................... 60/286 |
| 2001/0023666 A1 | 9/2001 | Suzuki |
| 2004/0149502 A1 * | 8/2004 | Itoh et al. ..................... 180/65.2 |
| 2005/0003927 A1 * | 1/2005 | Asakawa et al. .................. 477/3 |
| 2007/0185629 A1 * | 8/2007 | Kikuchi ......................... 701/22 |

FOREIGN PATENT DOCUMENTS

| JP | A 05-059982 | 3/1993 |
| JP | A 08-011591 | 1/1996 |

(Continued)

*Primary Examiner* — Frank B Vanaman
(74) *Attorney, Agent, or Firm* — Oliff & Berridge, PLC

(57) ABSTRACT

In a hybrid vehicle 20, when a deceleration demand based on accelerator-off is made in selecting an S position that allows arbitrary selection of shift positions SP1 to SP6, and fuel cut cannot be prohibited from a state of a battery 50, an engine 22 and motors MG1 and MG2 are controlled so that a driving force based on a torque demand Tr* is outputted with the fuel cut (Steps S410, S420, S360 to S400). When the deceleration demand based on the accelerator-off is made in selecting the S position, and the fuel cut can be prohibited from the state of the battery 50, the engine 22 and the motors MG1 and MG2 are controlled so that the engine 22 substantially performs self-sustaining operation at a target rotation speed Ne0 and a driving force based on the torque demand Tr* is outputted (Steps S340 to S400).

13 Claims, 12 Drawing Sheets

FOREIGN PATENT DOCUMENTS

| | | |
|---|---|---|
| JP | A 08-079907 | 3/1996 |
| JP | A 08-079914 | 3/1996 |
| JP | A 10-252533 | 9/1998 |
| JP | A 2001-271923 | 10/2001 |
| JP | A 2003-207043 | 7/2003 |
| JP | A 2003-267088 | 9/2003 |
| JP | A 2004-248472 | 9/2004 |
| JP | A 2006-070891 | 3/2006 |

* cited by examiner

HYBRID VEHICLE AND CONTROL METHOD OF THE SAME

TECHNICAL FIELD

The present invention relates to a hybrid vehicle and control method of the hybrid vehicle.

BACKGROUND ART

A conventionally known hybrid vehicle includes a motor generator placed between a torque converter that transmits power of an internal combustion engine to a drive shaft and an automatic transmission (for example, see Patent Document 1). In this hybrid vehicle, control is performed to prevent fuel cut of the internal combustion engine when it is determined that a temperature of a catalyst is higher than a predetermined criterion value in order to prevent degradation of the catalyst caused by being exposed to lean atmosphere at high temperatures. When a deceleration demand based on accelerator-off is made but the fuel cut is prohibited from a temperature state of the catalyst, a regenerative braking force is generated by a motor generator and regenerative electric power is accumulated in an accumulator unit such as a secondary battery in order to compensate for a reduction in the degree of deceleration caused by the prohibition of the fuel cut. In the hybrid vehicle, if there is a possibility that the regenerative electric power by the motor generator is not accumulated in the accumulator unit according to a state of the accumulator unit when the catalyst is at a high temperature and the deceleration demand based on accelerator-off is made, a required braking force is generated by a hydraulic brake instead of the regenerative braking force by the motor generator. In a vehicle which has an internal combustion engine as an only driving source and an automatic transmission with a manual transmission mode as an option, known techniques relating to the fuel cut include a technique of reducing a fuel cut rotation speed in selecting the manual transmission mode as compared with in selecting an automatic transmission mode (for example, see Patent Document 2), and a technique of increasing a fuel cut return rotation speed for restarting fuel supply in selecting the manual transmission mode as compared with in selecting an automatic transmission mode (for example, see Patent Document 3), in terms of making a so-called engine brake more effective, improving fuel consumption, or improving riding comfort or driving feeling.

[Patent Document 1] Japanese Patent Laid-Open No. 2003-207043

[Patent Document 2] Japanese Patent Laid-Open No. 5-59982

[Patent Document 3] Japanese Patent Laid-Open No. 8-11591

DISCLOSURE OF THE INVENTION

In the above described hybrid vehicle, the internal combustion engine can be operated at an arbitrary operation point. Thus, in recent years, to meet various needs of drivers, it has been proposed to apply, to a hybrid vehicle, a shift device that can arbitrarily set a desired operation condition among a plurality of operation conditions that define, in different manners, settable ranges of a required driving force required for driving and operation point constraints for determining a target rotation speed of an internal combustion engine corresponding to the required driving force, by changing shift positions. Such a shift device is applied to the hybrid vehicle, and a rotation speed of the internal combustion engine with fuel cut at the time of a deceleration demand such as in an accelerator-off state is changed, and thus a braking force corresponding to the selected shift position can be generated by an engine brake. However, when a driver is allowed to select an arbitrary shift position (operation condition), fuel cut may be frequently performed unless the fuel cut is prohibited according to a state of a catalyst. If the fuel cut is frequently performed, a large amount of air is fed to an exhaust gas purifying catalyst, and thus oxygen may attach to the catalyst to reduce NOx purifying performance of the catalyst.

Thus, a hybrid vehicle and a control method thereof according to the present invention has an object to prevent a reduction in purifying performance of an exhaust gas purifying catalyst when arbitrary selection of an operation condition that defines a settable range of a required driving force required for driving is allowed. The hybrid vehicle and the control method thereof according to the present invention has another object to satisfactorily prevent a reduction in purifying performance of the exhaust gas purifying catalyst to improve emission.

At least part of the above and the other related demands is attained by a hybrid vehicle and control method of the hybrid vehicle having the configurations discussed below.

The present invention is directed to a hybrid vehicle including: an internal combustion engine; a purifying unit including a catalyst for purifying exhaust gas exhausted from the internal combustion engine; and electric power-mechanical power input output mechanism that is connected to a first axle that is any one of axles and an output shaft of the internal combustion engine and can input and output power to the first axle and the output shaft with input and output of electric power and mechanical power; an electric motor that can input and output power to the first axle or a second axle that is any one of axles different from the first axle; an accumulator unit that can supply and receive electric power to and from the electric power-mechanical power input output mechanism and the electric motor; a fuel supply stop determination module that determines whether a stop of fuel supply to the internal combustion engine can be prohibited based on a state of the accumulator unit; an operation condition setting module that sets any one of a plurality of operation conditions that define, in different manners, settable ranges of a required driving force at least required for driving as an operation condition for execution, and allows a driver to select an arbitrary operation condition under a predetermined condition; a required driving force setting module that sets the required driving force according to the set operation condition for execution; and a control unit that controls the internal combustion engine, the electric power-mechanical power input output mechanism, and the electric motor so that a driving force based on the set required driving force is outputted with the stop of the fuel supply, when a deceleration demand is made in a state where the operation condition setting module allows selection of the arbitrary operation condition, and the fuel supply stop determination module determines that the stop of the fuel supply cannot be prohibited, and controls the internal combustion engine, the electric power-mechanical power input output mechanism, and the electric motor so that the internal combustion engine substantially performs self-sustaining operation at a predetermined rotation speed and a driving force based on the set required driving force is outputted, when the deceleration demand is made and the fuel supply stop determination module determines that the stop of the fuel supply can be prohibited.

In the hybrid vehicle, the driver can arbitrarily select any one of the plurality of operation conditions that define the settable ranges of the required driving force at least required for driving under the predetermined condition. When the deceleration demand is made in the state where the driver is allowed to select the arbitrary operation condition, and the stop of the fuel supply to the internal combustion engine cannot be prohibited from the state of the accumulator unit, the internal combustion engine, the electric power-mechanical power input output mechanism, and the electric motor are controlled so that the driving force based on the set required driving force is outputted with the stop of the fuel supply to the internal combustion engine. When the deceleration demand is made in the state where the driver is allowed to select the arbitrary operation condition, and the stop of the fuel supply to the internal combustion engine can be prohibited from the state of the accumulator unit, the internal combustion engine, the electric power-mechanical power input output mechanism, and the electric motor are controlled so that the internal combustion engine substantially performs the self-sustaining operation at the predetermined rotation speed and the driving force based on the set required driving force is outputted. Specifically, in the state where the driver is allowed to select the arbitrary operation condition, the fuel supply is easily stopped when the deceleration demand is made from the relationship with the required driving force based on the selected operation condition. Without any measure, the stop of the fuel supply causes a large amount of air to be fed to the exhaust gas purifying catalyst, and oxygen may attach to the catalyst to reduce purifying performance. Thus, when the deceleration demand is made in the state where the driver is allowed to select the arbitrary operation condition, the driving force based on the required driving force is obtained with the substantial self-sustaining operation of the internal combustion engine without the stop of the fuel supply, except the case where the stop of the fuel supply to the internal combustion engine has to be prohibited from the state of the accumulator unit. This can prevent a reduction in purifying performance of the catalyst caused by the stop of the fuel supply, and thus improve emission. The substantial self-sustaining operation of the internal combustion engine includes operation without an output of power (torque) from the internal combustion engine, and operation with a slight output of power (torque) from the internal combustion engine.

In one preferable embodiment of the hybrid vehicle of the invention, the deceleration demand includes a deceleration demand due to an accelerator operation state being an accelerator-off state, and a deceleration demand due to the accelerator operation state staying in an accelerator-on state and an accelerator opening being reduced. When these deceleration demands are made, the fuel supply to the internal combustion engine is generally stopped. In such a case, the driving force (braking force) based on the required driving force is obtained with the substantial self-sustaining operation of the internal combustion engine without the stop of the fuel supply, except the case where the stop of the fuel supply to the internal combustion engine has to be prohibited from the state of the accumulator unit. This can prevent a reduction in purifying performance of the catalyst, and thus improve emission.

In another preferable embodiment of the hybrid vehicle of the invention, the fuel supply stop determination module determines that the stop of the fuel supply can be prohibited when an amount of charge left in the accumulator unit is a predetermined upper limit value or less, or when charge allowable electric power that is electric power allowed for charging the accumulator unit and is set based on the state of the accumulator unit is a predetermined charge limit value or less. This allows more proper determination of whether the stop of the fuel supply to the internal combustion engine can be prohibited based on the state of the accumulator unit.

In still another preferable embodiment of the hybrid vehicle of the invention, the upper limit value and the charge limit value is determined based on electric power inputted and outputted by the electric power-mechanical power input output mechanism and the electric motor when the required driving force at the time of the deceleration demand is obtained with the substantial self-sustaining operation of the internal combustion engine without the stop of the fuel supply. The upper limit value and the charge limit value as thresholds are thus determined to allow the prohibition of the stop of the fuel supply to the internal combustion engine to be canceled at appropriate timing and prevent degradation by overcharge of the accumulator unit.

In still another preferable embodiment of the hybrid vehicle of the invention, the operation condition setting module is a shift setting module that sets a shift position for execution among a plurality of shift positions according to a driver's shift operation, the plurality of operation conditions correspond to the plurality of shift positions, and the plurality of shift positions include a sequential shift position that allows the driver to select an arbitrary shift position.

In still another preferable embodiment of the hybrid vehicle of the invention, an operation condition that the driver is allowed to select when the sequential shift position is selected defines a settable range of the required driving force and an operation point constraint for determining a target rotation speed of the internal combustion engine corresponding to the required driving force, and the control unit controls the internal combustion engine, the electric power-mechanical power input output mechanism, and the electric motor so that the internal combustion engine is operated at the target rotation speed set based on the operation point constraint and a driving force based on the set required driving force is outputted with the stop of the fuel supply, when the deceleration demand is made and the fuel supply stop determination module determines that the stop of the fuel supply cannot be prohibited.

In still another preferable embodiment of the hybrid vehicle of the invention, the electric power-mechanical power input output mechanism includes a three shaft-type power input output module that is connected to the first axle, the output shaft of the internal combustion engine, and a rotatable third shaft, and inputs and outputs power determined based on power inputted and outputted to any two shafts among the three shafts to a remaining shaft, and a generator that can input and output power to the third shaft.

The present invention is also directed to a control method of a hybrid vehicle including: an internal combustion engine; a purifying unit including a catalyst for purifying exhaust gas exhausted from the internal combustion engine; an electric power-mechanical power input output mechanism that is connected to a first axle that is any one of axles and an output shaft of the internal combustion engine and can input and output power to the first axle and the output shaft with input and output of electric power and mechanical power; an electric motor that can input and output power to the first axle or a second axle that is any one of axles different from the first axle; an accumulator unit that can supply and receive electric power to and from the electric power-mechanical power input output mechanism and the electric motor; and an operation condition setting module that sets any one of a plurality of operation conditions that define, in different manners, driving force setting constraints for determining ranges of a required driving force at least required for driving as an operation condition for execution, and allows a driver to select an arbitrary operation condition under a predetermined condition. The control method including the step of: (a) controlling the internal combustion engine, the electric power-mechanical power input output mechanism, and the electric motor so that a driving force based on the required driving force set according to the set operation condition for execution is outputted with the stop of the fuel supply to the internal combustion engine, when a deceleration demand is made in a state where the operation condition setting module allows selection of the arbitrary operation condition, and the stop of the fuel supply to the internal combustion engine cannot be prohibited from a state of the accumulator unit, and controlling the internal combustion engine, the electric power-mechanical power input output mechanism, and the electric motor so that the internal combustion engine substantially performs self-sustaining operation at a predetermined rotation speed and a driving force based on the required driving force set according to the set operation condition for execution is outputted, when the deceleration demand is made and the stop of the fuel supply can be prohibited from the state of the accumulator unit.

When the driver can arbitrarily select any one of the plurality of operation conditions that define the settable range of the required driving force at least required for driving as in the hybrid vehicle to which the method is applied, in the state where the driver is allowed to select the arbitrary operation condition, the fuel supply is easily stopped when the deceleration demand is made from the relationship with the required driving force based on the selected operation condition. The stop of the fuel supply causes a large amount of air to be fed to the exhaust gas purifying catalyst, and oxygen may attach to the catalyst to reduce purifying performance. Thus, as in the method, when the deceleration demand is made in the state where the driver is allowed to select the arbitrary operation condition, the driving force based on the required driving force is obtained with the substantial self-sustaining operation of the internal combustion engine without the stop of the fuel supply, except the case where the stop of the fuel supply to the internal combustion engine has to be prohibited from the state of the accumulator unit. This can prevent a reduction in purifying performance of the catalyst, and thus improve emission.

In one preferable embodiment of the control method of the hybrid vehicle of the invention, the deceleration demand includes a deceleration demand due to an accelerator operation state being an accelerator-off state, and a deceleration demand due to the accelerator operation state staying in an accelerator-on state and an accelerator opening being reduced.

In another preferable embodiment of the control method of the hybrid vehicle of the invention, the control method further including the step of: (b) determining whether the stop of the fuel supply to the internal combustion engine can be prohibited based on the state of the accumulator unit, and the step (b) includes determining that the stop of the fuel supply can be prohibited when an amount of charge left in the accumulator unit is a predetermined upper limit value or less, or when charging allowable electric power that is electric power allowed for charging the accumulator unit and is set based on the state of the accumulator unit is a predetermined charge limit value or less.

In still another preferable embodiment of the control method of the hybrid vehicle of the invention, the upper limit value and the charge limit value are determined based on electric power inputted and outputted by the electric power-mechanical power input output mechanism and the electric motor when the required driving force at the time of the deceleration demand is obtained with the substantial self-sustaining operation of the internal combustion engine without the stop of the fuel supply.

In still another preferable embodiment of the control method of the hybrid vehicle of the invention, the operation condition setting module is a shift setting module that sets a shift position for execution among a plurality of shift positions according to a driver's shift operation, the plurality of operation conditions correspond to the plurality of shift positions, and the plurality of shift positions include a sequential shift position that allows the driver to select an arbitrary shift position.

In still another preferable embodiment of the control method of the hybrid vehicle of the invention, an operation condition that the driver is allowed to select when the sequential shift position is selected defines a settable range of the required driving force and an operation point constraint for determining a target rotation speed of the internal combustion engine corresponding to the required driving force, and the step (a) includes controlling the internal combustion engine, the electric power-mechanical power input output mechanism, and the electric motor so that the internal combustion engine is operated at the target rotation speed set based on the operation point constraint and a driving force based on the set required driving force is outputted with the stop of the fuel supply, when the deceleration demand is made and the fuel supply stop determination module determines that the stop of the fuel supply cannot be prohibited.

BEST MODE FOR CARRYING OUT THE INVENTION

Now, the best mode for carrying out the present invention will be described by an embodiment.

Figure 1:
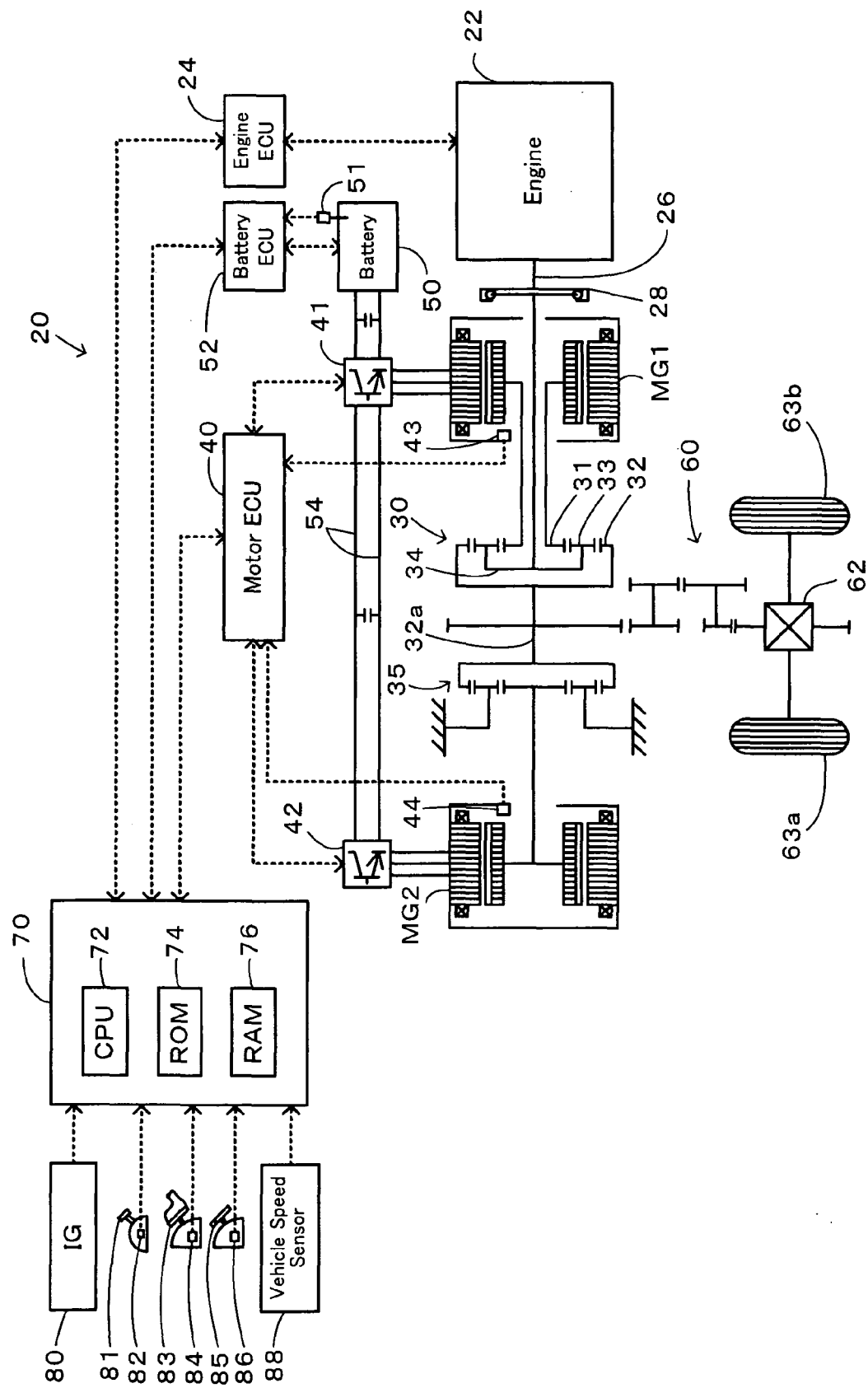
FIG. 1 is a schematic block diagram of a hybrid vehicle 20 according to an embodiment of the present invention.

FIG. 1 is a schematic block diagram of a hybrid vehicle according to an embodiment of the present invention. The hybrid vehicle 20 in FIG. 1 includes an engine 22, a three shaft-type power distribution and integration mechanism 30 connected to a crankshaft 26 as an output shaft of the engine 22 via a damper 28, a motor MG1 that is connected to the power distribution and integration mechanism 30 and can generate electric power, a reduction gear 35 mounted to a ring gear shaft 32a as a drive shaft connected to the power distribution and integration mechanism 30, a motor MG2 connected to the reduction gear 35, and a hybrid electronic control unit (hereinafter referred to as a hybrid ECU) 70 that controls the entire power output device.

The engine 22 is configured as an internal combustion engine that can output power using hydrocarbon fuel such as gasoline or gas oil. As is seen from FIG. 2, in the engine 22, air cleaned by an air cleaner 122 is taken into an intake port via a throttle valve 124 and gasoline is injected from a fuel injection valve 126 to mix intake air and gasoline, the air/fuel mixture is sucked into a combustion chamber via an intake valve 128 and fired by electric spark from an ignition plug 130, and reciprocating motion of a piston 132 pushed down by energy of the firing is converted into rotation motion of the crankshaft 26. Exhaust gas from the engine 22 is exhausted to the outside via a purifying device 134 including an exhaust gas purifying catalyst (three way catalyst) for purifying harmful components such as carbon monoxide (CO), hydrocarbon (HC), or nitrogen oxides (NOx). The exhaust gas purifying catalyst in the purifying device 134 is preferably constituted by an oxidation catalyst such as platinum (Pt) or palladium (Pd), a reduction catalyst such as rhodium (Rh), and a promoter such as ceria ($CeO_2$). In this case, CO or HC contained in exhaust gas is cleaned into water ($H_2O$) or carbon dioxide ($CO_2$) by the action of the oxidation catalyst, and NOx contained in the exhaust gas is cleaned into nitrogen ($N_2$) or oxygen ($O_2$) by the action of the reduction catalyst.

Figure 2:
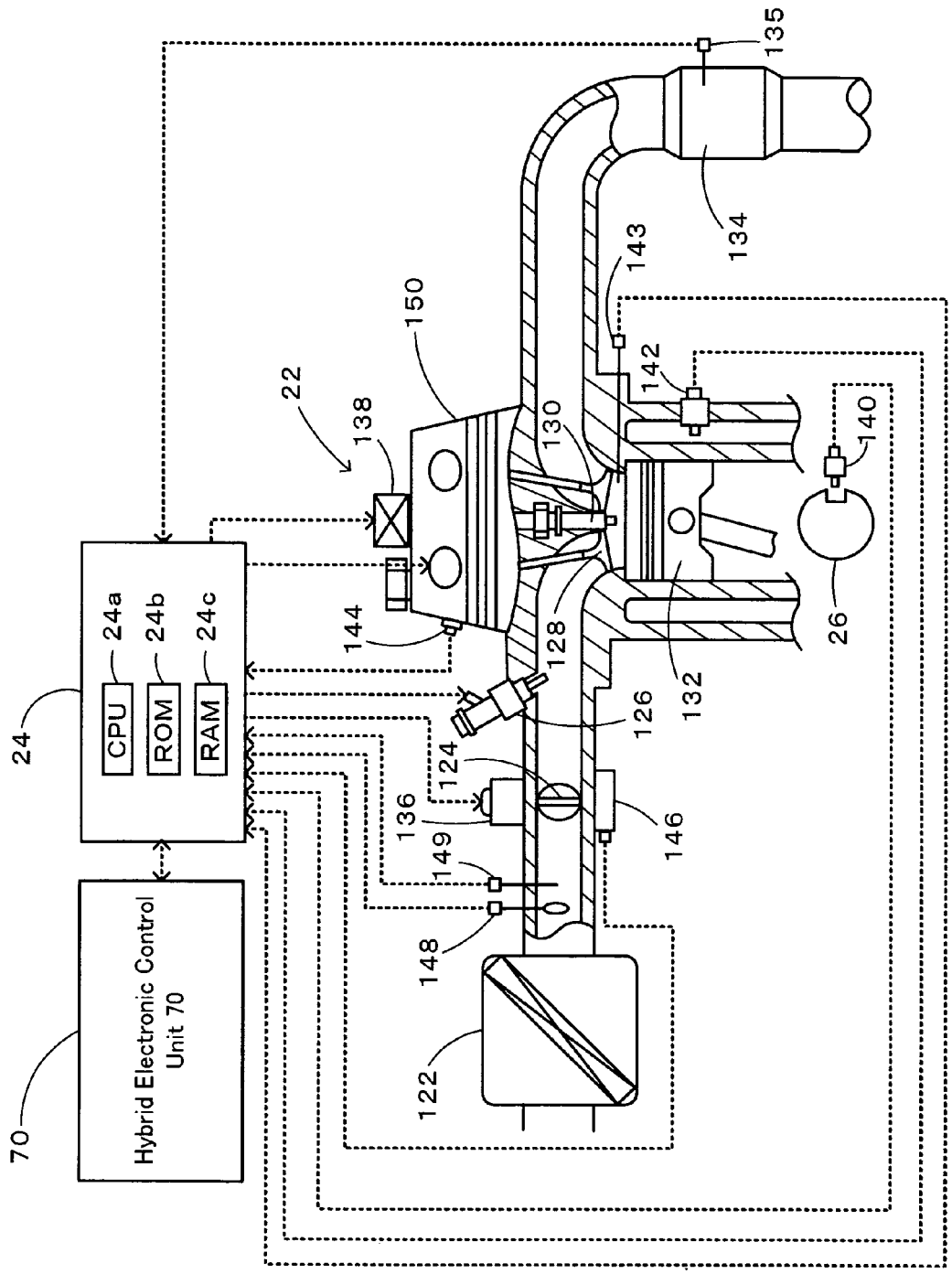
FIG. 2 is a schematic block diagram of an engine 22.

The engine 22 thus configured is controlled by an engine electronic control unit (hereinafter referred to as an engine ECU) 24. As shown in FIG. 2, the engine ECU 24 is configured as a microprocessor mainly including a CPU 24a, a ROM 24b that stores a processing program, a RAM 24c that temporarily stores data, and unshown input and output ports and communication ports. To the engine ECU 24, for example, a crank position from a crank position sensor 140 that detects a rotational position of the crankshaft 26, cooling water temperature from a water temperature sensor 142 that detects temperature of cooling water of the engine 22, pressure in a cylinder from a pressure sensor 143 for detecting pressure in a cylinder that is pressure in a combustion chamber, a cam position from a cam position sensor 144 that detects a rotational position of a cam shaft that opens and closes the intake valve 128 and an exhaust valve that supply and exhaust air to and from the combustion chamber, a throttle position from a throttle valve position sensor 146 for detecting a position of the throttle valve 124, a signal from an airflow meter 148 provided in an intake pipe, intake air temperature from a temperature sensor 149 also provided in the intake pipe, and a catalyst floor temperature Tcat from a temperature sensor 135 provided in the purifying device 134 are input via the input port. From the engine ECU 24, various control signals for driving the engine 22, for example, a drive signal to the fuel injection valve 126, a drive signal to a throttle motor 136 that adjusts the position of the throttle valve 124, a control signal to an ignition coil 138 integrated with an igniter, and a control signal to a variable valve timing mechanism 150 that can change opening and closing timing of the intake valve 128 are output via the output port. The engine ECU 24 communicates with the hybrid electronic control unit 70, and controls operation of the engine 22 by a control signal from the hybrid ECU 70 and outputs data on an operation state of the engine 22 to the hybrid ECU 70 as required.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid ECU 70 to control operations of the motors MG1 and MG2 in response to control signals transmitted from the hybrid ECU 70 while outputting data relating to the operating conditions of the motors MG1 and MG2 to the hybrid ECU 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid ECU 70 or the engine ECU 24 via communication according to the requirements. The battery ECU 52 calculates a state of charge (SOC) of the battery 50, based on the accumulated charge-discharge current measured by the current sensor, for control of the battery 50.

The hybrid ECU 70 is constructed as a microprocessor including a CPU 72, a ROM 74 that stores processing programs, a RAM 76 that temporarily stores data, and a non-illustrated input-output port, and a non-illustrated communication port. The hybrid ECU 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid ECU 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

In the hybrid vehicle 20 in the embodiment, shift positions SP of a shift lever 81 includes a parking position used in parking, a reverse position for backward driving, a neutral position, and a normal drive position for forward driving (hereinafter referred to as a D position), and further includes a sequential shift position (hereinafter referred to as an S position), an up-shift indication position, and a down-shift indication position. When the D position is selected as a shift position SP, the hybrid vehicle 20 in the embodiment is driven and controlled so that the engine 22 is efficiently operated. When the S position is selected as a shift position SP, a ratio of a rotation speed of the engine 22 to a vehicle speed V can be changed, for example, in six stages (SP1 to SP6) mainly in deceleration. In the embodiment, when the driver sets the shift lever 81 in the S position, the shift position SP is set to SP5 in a fifth stage, and a shift position sensor 82 detects that the shift position SP is SP5. Thereafter, when the shift lever 81 is set to the up-shift indication position, the shift position SP is shifted up one stage a time, while when the shift lever 81 is set to the down-shift indication position, the shift position SP is shifted down one stage at a time, and the shift position sensor 82 outputs the present shift position SP according the operation of the shift lever 81.

In the hybrid vehicle 20 thus configured according to the embodiment, operation of the engine 22 and the motors MG1 and MG2 is controlled so that a torque demand Tr* to be outputted to the ring gear shaft 32a as the drive shaft is calculated based on the accelerator opening Acc corresponding to the depression amount of the accelerator pedal 83 by the driver and the vehicle speed V, and power corresponding to the torque demand Tr* is outputted to the ring gear shaft 32a. Operation control modes of the engine 22 and the motors MG1 and MG2 include: a torque conversion operation mode in which the operation of the engine 22 is controlled so that power corresponding to the power demand is outputted from the engine 22, and the motor MG1 and the motor MG2 are driven and controlled so that all of the power outputted from the engine 22 is torque converted by the power distribution and integration mechanism 30 and the motors MG1 and MG2 and outputted to the ring gear shaft 32a; a charge-discharge operation mode in which the operation of the engine 22 is controlled so that power corresponding to the sum of the power demand and electric power required for charging and discharging the battery 50 is outputted from the engine 22, and the motor MG1 and the motor MG2 are driven and controlled so that all or part of the power outputted from the engine 22 with the charge and discharge of the battery 50 is torque converted by the power distribution and integration mechanism 30 and the motors MG1 and MG2, and the power demand is outputted to the ring gear shaft 32a; and a motor operation mode in which operation is controlled so that the operation of the engine 22 is stopped and power corresponding to the power demand is outputted from the motor MG2 to the ring gear shaft 32a.

Next, operation of the hybrid vehicle 20 in the embodiment, particularly, operation of the hybrid vehicle 20 when the driver selects the S position as the shift position SP will be described. Operation of the hybrid vehicle 20 in selecting the S position will be herein described for the case where the accelerator operation state is the accelerator-on state and the case where the accelerator operation state is the accelerator-off state.

Figure 3:
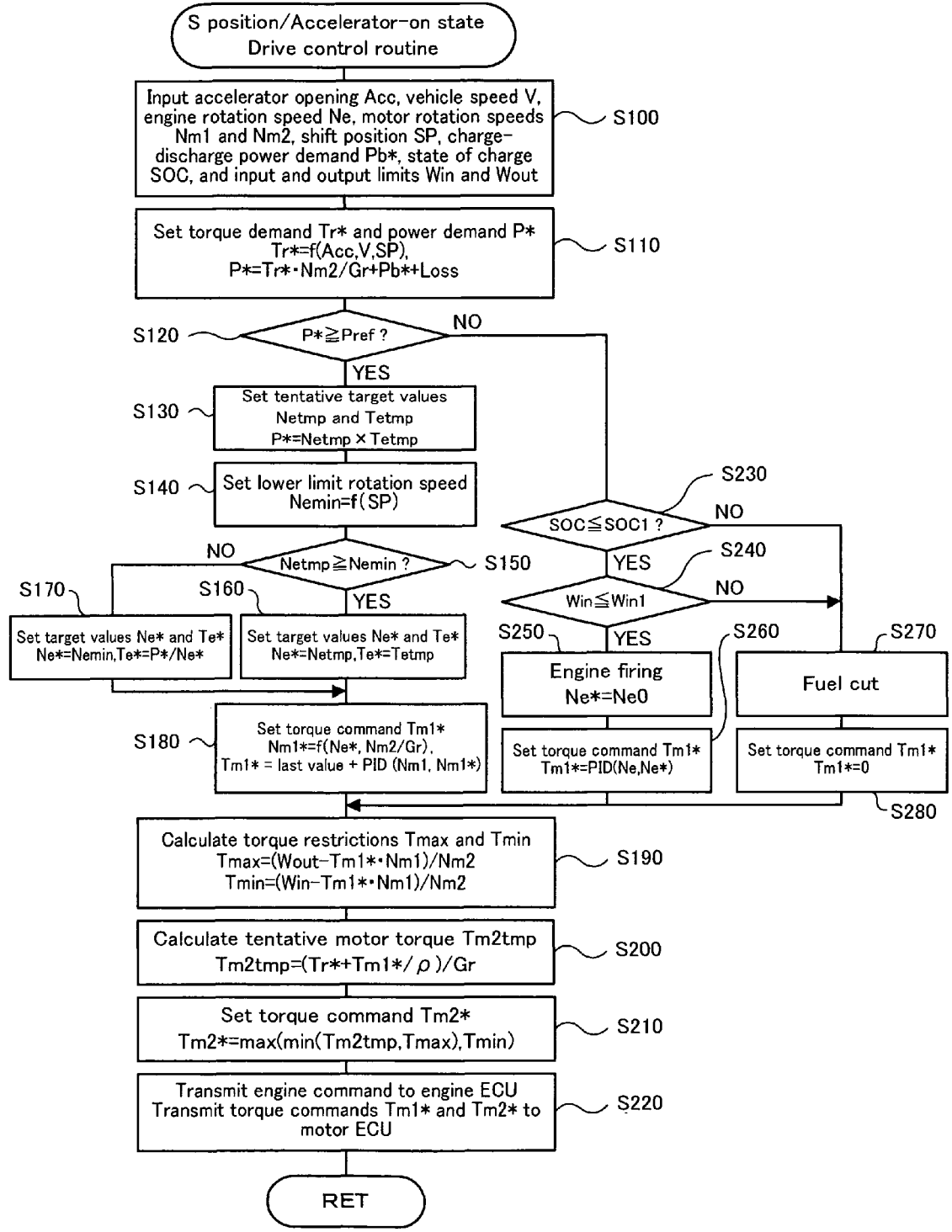
FIG. 3 is a flowchart showing an example of a drive control routine performed by a hybrid electric control unit 70 in the embodiment when an S position is selected as a shift position SP, and an accelerator operation state is an accelerator-on state.

FIG. 3 is a flowchart showing an example of a drive control routine performed by the hybrid ECU 70 when the driver selects the S position as the shift position SP, and the accelerator operation state is the accelerator-on state. This routine is repeatedly performed every predetermined time (for example, every few milliseconds) when the accelerator operation state is the accelerator-on state. When the drive control routine in FIG. 3 is started, the CPU 72 of the hybrid ECU 70 first performs a processing for inputting data required for control such as the accelerator opening Acc from the accelerator pedal position sensor 84, the vehicle speed V from the vehicle speed sensor 88, rotation speeds Nm1 and Nm2 of the motors MG1 and MG2, the shift position SP from the shift position sensor 82, charge-discharge power demand Pb* to be charged and discharged by the battery 50, the state of charge (SOC) of the battery 50, and the input and output limits Win and Wout of the battery 50 (Step S100). In this case, the rotation speeds Nm1 and Nm2 of the motors MG1 and MG2 calculated based on rotational positions of rotors of the motors MG1 and MG2 detected by the rotational position detection sensors 43 and 44 are inputted from the motor ECU

Figure 4:
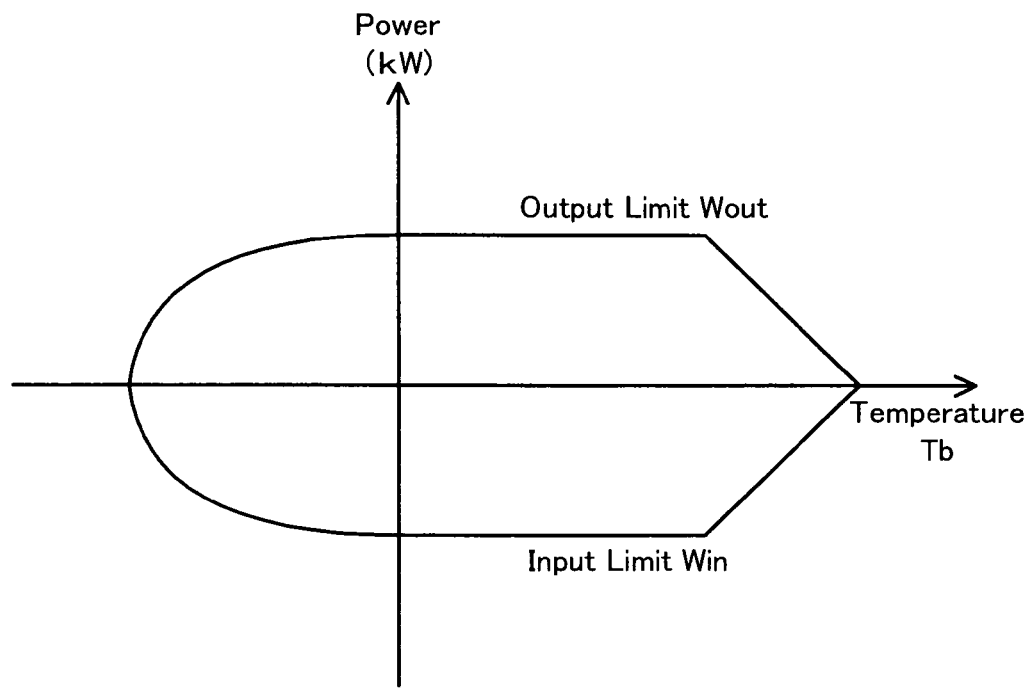
FIG. 4 illustrates an example of a relationship between a battery temperature Tb and input and output limits Win and Wout of a battery 50.
Figure 5:
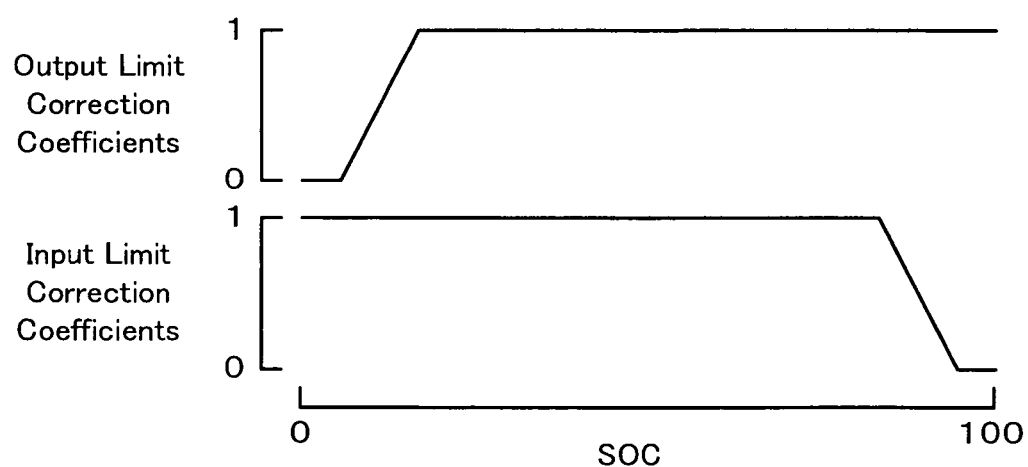
FIG. 5 illustrates an example of a relationship between a state of charge (SOC) of the battery 50 and correction coefficients of the input and output limits Win and Wout.

40 by communication. The charge-discharge power demand Pb* and the state of charge (SOC) are inputted from the battery ECU 52 by communication. The input limit Win as charging allowable electric power that is electric power allowed for charging the battery 50 and the output limit Wout as discharging allowable electric power that is electric power allowed for discharging the battery 50 set based on the battery temperature Tb of the battery 50 detected by the temperature sensor 51 and the state of charge SOC of the battery 50 are inputted from the battery ECU 52 by communication. The input and output limits Win and Wout of the battery 50 can be set in such a manner that basic values of the input and output limits Win and Wout are set based on the battery temperature Tb, an output limit correction coefficient and an input limit correction coefficient are set based on the state of charge (SOC) of the battery 50, and the set basic values of the input and output limits Win and Wout are multiplied by the correction coefficients. FIG. 4 illustrates an example of a relationship between the battery temperature Tb and the input and output limits Win and Wout, and FIG. 5 illustrates an example of a relationship between the state of charge (SOC) of the battery 50 and the correction coefficients of the input and output limits Win and Wout.

Figure 6:
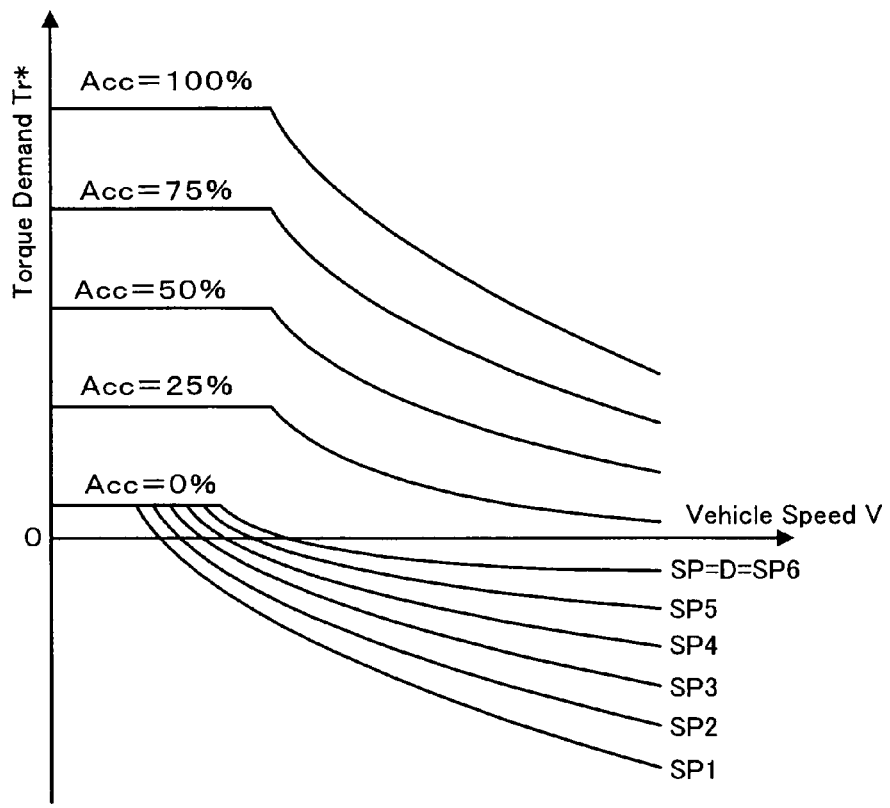
FIG. 6 illustrates an example of a torque demand setting map.

After the data input processing in Step S100, the torque demand Tr* to be outputted to the ring gear shaft 32*a* as the drive shaft connected to the drive wheels 63*a* and 63*b*, and the power demand P* required for the entire vehicle in driving are set based on the inputted accelerator opening Acc, vehicle speed V and shift position SP (Step S110). In the embodiment, a relationship between the accelerator opening Acc, the vehicle speed V and the shift position SP, and the torque demand Tr* are previously determined and stored in the ROM 74 as a torque demand setting map that defines a settable range of a required driving force, and when the acceleration opening Acc, the vehicle speed V and the shift position SP are provided, the torque demand Tr* corresponding thereto is derived from the map and set. In the embodiment, among the cases where the shift position SP is the D position and the shift positions SP1 to SP6, the torque demand Tr* is set under the same constraint in the accelerator-on state, while the torque demand (braking torque) Tr* set at the accelerator opening Acc of 0% (accelerator-off) differs. FIG. 6 shows an example of the torque demand setting map. In the embodiment, the power demand P* is set as the sum of the set torque demand Tr* multiplied by a rotation speed Nr (=Nm2/Gr) of the ring gear shaft 32*a*, the charge-discharge power demand Pb* to be charged and discharged by the battery 50, and a loss Loss.

Figure 7:
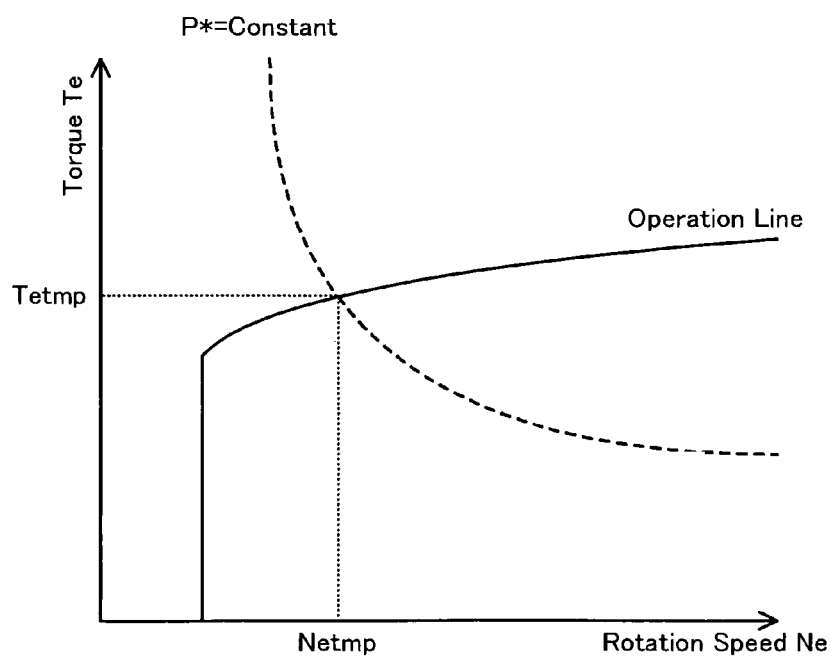
FIG. 7 illustrates an operation line of the engine 22 and a correlation curve between a target rotation speed Ne* and target torque Te*.

Then, it is determined whether the set power demand P* is a predetermined threshold Pref or more (Step S120). The threshold Pref used herein is a lower limit or near the lower limit of power in a range that allows relatively efficient operation of the engine 22, determined based on characteristics of the engine 22 and the motor MG2 for determining whether power (torque) is to be outputted to the engine 22. When it is determined in Step S120 that the power demand P* is the threshold Pref or more, the power demand P* is outputted to the engine 22, and a tentative target rotation speed Netmp and tentative-target torque Tetmp of the engine 22 are set based on the power demand P* (Step S130). Herein, the tentative target rotation speed Netmp and the tentative target torque Tetmp are set based on an operation line for efficiently operating the engine 22 and the power demand P*. FIG. 7 shows an example of the operation line of the engine 22 and an example of a correlation curve between the tentative target rotation speed Netmp and the tentative target torque Tetmp. As shown in FIG. 7, the tentative target rotation speed Netmp and the tentative target torque Tetmp can be calculated from an intersection between the operation line and the correlation curve showing a constant power demand P* (Netmp×Tetmp). The tentative target rotation speed Netmp and the tentative target torque Tetmp are thus set, and then a lower limit engine rotation speed Nemin as a lower limit value of the rotation speed of the engine 22 is set based on the shift position SP inputted in Step S100 (Step S140). The lower limit engine rotation speed Nemin is previously determined as a minimum rotation speed that allows a sufficiently broad range of increase and decrease of power from the engine 22 and allows quick increase and decrease of the power in order from the shift position SP1 to the shift position SP6, and stored in ROM 74. In the entire vehicle speed range or when the vehicle speed V is less than a predetermined value, the lower limit engine rotation speed Nemin may be determined based on the shift position SP and the vehicle speed V. In this case, a map for determining a relationship between the shift position SP, the vehicle speed V, and the lower limit engine rotation speed Nemin may be previously prepared and stored in the ROM 74.

After the lower limit engine rotation speed Nemin is set, the lower limit engine rotation speed Nemin is compared with the tentative target rotation speed Netm set in Step S130 (Step S150). When the tentative target rotation speed Netmp is the lower limit engine rotation speed Nemin or more, it is determined that the range of increase and decrease of the power from the engine 22 is sufficiently broad and quick increase and decrease of the power is allowed, the tentative target rotation speed Netmp set in Step S130 is set as the target rotation speed Ne* of the engine 22, and the tentative target torque Tetmp set in the Step S130 is set as the target torque Te* of the engine 22 (Step S160). On the other hand, when the tentative target rotation speed Netmp is less than the lower limit engine rotation speed Nemin, the lower limit engine rotation speed Nemin set in Step S140 is set as the target rotation speed Ne* of the engine 22 so that the range of increase and decrease of the power from the engine 22 becomes sufficiently broad and quick increase and decrease of the power is allowed, and the target torque Te* (P*/Ne*) of the engine 22 is calculated from the set target rotation speed Ne*(=Netmp) and the power demand P* and set as the target torque Te* of the engine 22 (Step S170). Thus, when the S position is selected as the shift position SP, the target rotation speed Ne* of the engine 22 is the lower limit rotation speed Nemin determined for each of the shift positions SP1 to SP6 or more, thereby allowing quick response to driver's acceleration and deceleration demand.

Figure 8:
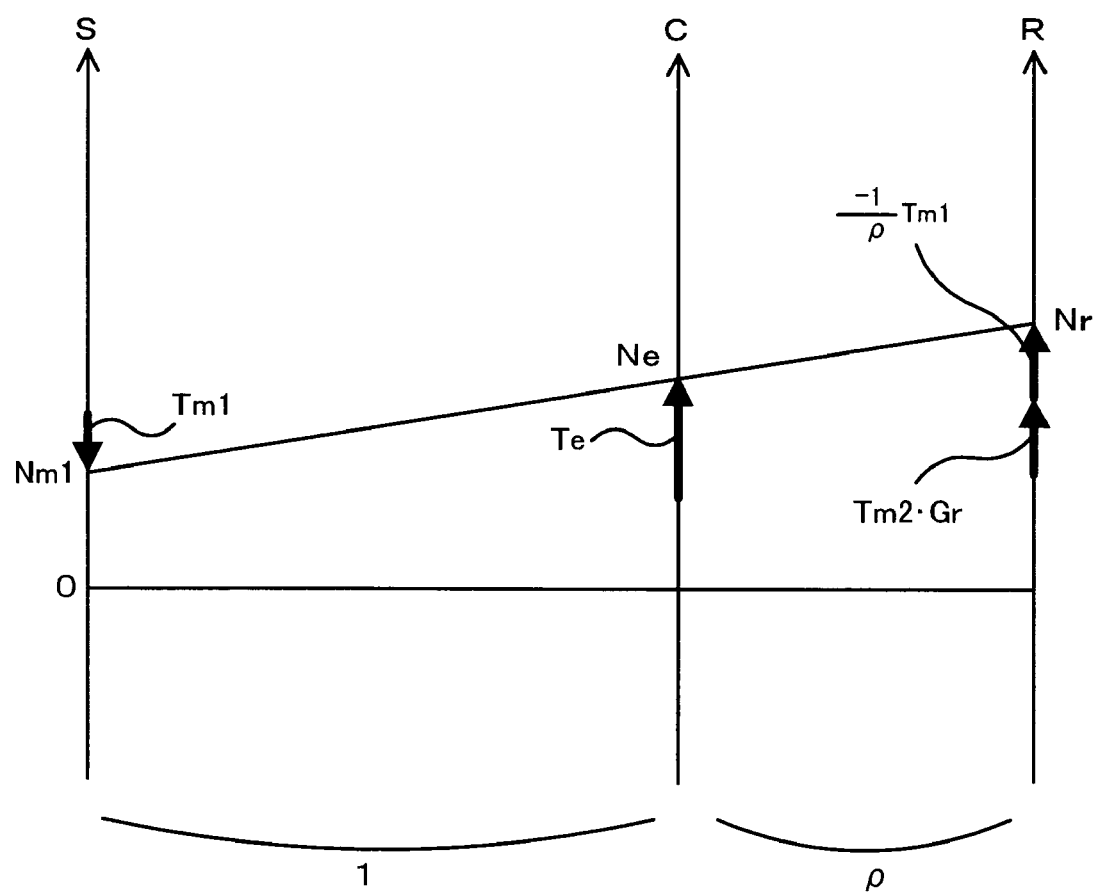
FIG. 8 is an alignment chart illustrating a dynamic relationship between a rotation speed and torque of each rotating element of a power distribution and integration mechanism 30 in an accelerator-on state.

The target rotation speed Ne* and the target torque Te* of the engine 22 as engine commands are thus set, then a target rotation speed Nm1* of the motor MG1 is calculated based on the set target rotation speed Ne*, the rotation speed Nr (=Nm2/Gr) of the ring gear shaft 32*a*, and a gear ratio ρ of the power distribution and integration mechanism 30 by the following formula (1), and a torque command Tm1* of the motor MG1 is calculated based on the calculated target rotation speed Nm1* and the present rotation speed Nm1 by the following formula (2) (Step S180). The formula (1) is a dynamic relational expression of a rotating element of the power distribution and integration mechanism 30. FIG. 8 is an alignment chart illustrating a dynamic relationship between a rotation speed and torque of each rotating element of the power distribution and integration mechanism 30 in the accelerator-on state. In FIG. 8, an S-axis on the left indicates a rotation speed of the sun gear 31 that matches the rotation speed Nm1 of the motor MG1, a C-axis indicates a rotation speed of the carrier 34 that matches the rotation speed Ne of the engine 22, and an R-axis indicates a rotation speed Nr of the ring gear 32 obtained by dividing the rotation speed Nm2 of the motor MG2 by the gear ratio Gr of the reduction gear 35. Two bold arrows on the R-axis indicate torque including torque Tm1 outputted from the motor MG1 and applied to the ring gear shaft 32a, and torque including torque Tm2 outputted from the motor MG2 and applied to the ring gear shaft 32a via the reduction gear 35. The formula (1) for calculating the target rotation speed Nm1* of the motor MG1 can be easily derived using the relationship of the rotation speed in this alignment chart. In the formula (1), ρ is the gear ratio of the power distribution and integration mechanism 30 (the number of teeth of the sun gear 31/the number of teeth of the ring gear 32). In the formula (2), "k1" in the second term on the right side is a gain of a proportional term, and "k2" in the third term on the right side is a gain of an integral term.

$$Nm1^* = Ne^* \cdot (1+\rho)/\rho - Nm2/(Gr \cdot \rho) \quad (1)$$

$$Tm1^* = \text{last } Tm1^* + k1(Nm1^* - Nm1) + k2\int(Nm1^* - Nm1)d \quad (2)$$

When the torque command Tm1* is set, a deviation between the output limit Wout or the input limit Win of the battery 50 inputted in Step S100 by the following formulas (3) and (4) and power consumption of the motor MG1 obtained by multiplying the set torque command Tm1* of the motor MG1 by the present rotation speed Nm1 of the motor MG1 is divided by the rotation speed Nm2 of the motor MG2 to calculate torque restrictions Tmax and Tmin as upper and lower limits of torque that may be outputted from the motor MG2 (Step S190). Further, tentative motor torque Tm2tmp as torque to be outputted from the motor MG2 is calculated using the torque demand Tr*, the torque command Tm1*, the gear ratio ρ of the power distribution and integration mechanism 30, and the gear ratio Gr of the reduction gear 35 by the following formula (5) (Step S200), and the calculated tentative motor torque Tm2tmp is restricted by the torque restrictions Tmax and Tmin to set a torque command Tm2* of the motor MG2 (Step S210). The torque command Tm2* of the motor MG2 is thus set to allow the torque demand Tr* outputted to the ring gear shaft 32a to be set as torque basically restricted within the range of the input and output limits Win and Wout of the battery 50. The formula (5) can be easily derived from the alignment chart in FIG. 8. The target rotation speed Ne* and the target torque Te* of the engine 22, and the torque commands Tm1* and Tm2* of the motors MG1 and MG2 are thus set, and the target rotation speed Ne* and the target torque Te* of the engine 22 as the engine commands are transmitted to the engine ECU 24, the torque commands Tm1* and Tm2* of the motors MG1 and MG2 are transmitted to the motor ECU 40 (Step S220), and the routine is once finished. The engine ECU 24 having received the target rotation speed Ne* and the target torque Te* performs control to obtain the target rotation speed Ne* and the target torque Te*. The motor ECU 40 having received the torque commands Tm1* and Tm2* performs switching control of switching elements of the inverters 41 and 42 so that the motor MG1 is driven by the torque command Tm1* and the motor MG2 is driven by the torque command Tm2*.

$$Tmax = (Wout^* - Tm1^* \cdot Nm1)/Nm2 \quad (3)$$

$$Tmin = (Win - Tm1^* \cdot Nm1)/Nm2 \quad (4)$$

$$Tm2tmp = (Tr^* + Tm1^*/\rho)/Gr \quad (5)$$

On the other hand, for example, when the driver suddenly reduces the accelerator opening Acc from a relatively high state (for example, a substantially fully opened state) to a relatively low state (for example, about 5%), and the deceleration demand is made due to the accelerator opening being reduced with the accelerator operation state being the accelerator-on state, the power demand P* required for the entire vehicle is set to a relatively low value in Step S110, and thus it is sometimes determined in Step S120 that the power demand P* is less than the threshold Pref. In such a case, it is first determined whether the state of charge SOC of the battery 50 inputted in Step S100 is a predetermined upper limit value SOC1 or less (Step S230). When the state of charge SOC is the upper limit value SOC1 or less, it is determined whether the input limit Win of the battery 50 inputted in Step S100 is a predetermined charge limit value Win1 or less as charging electric power (Step S240). The upper limit value SOC1 used in Step S230 and the charge limit value Win1 used in Step S240 are determined based on electric power inputted and outputted by the motors MG1 and MG2 when the required driving force at the time of deceleration demand is obtained with substantial self-sustaining operation of the engine 22 without fuel cut as described later.

When the state of charge SOC is the upper limit value SOC1 or less, and the input limit Win of the battery 50 is the charge limit value Win1 or less, a command for continuing the firing of the engine 22 is set as an engine command, and the target rotation speed Ne* of the engine 22 is set to a rotation speed Ne0 at the time of continuation of the firing so that the engine 22 substantially performs the self-sustaining operation without any output of torque (Step S250). In the embodiment, the rotation speed Ne0 is, for example, a rotation speed (800 to 1000 rpm) in idling. Then, calculation is performed based on the set target rotation speed Ne* (=Ne0) and the rotation speed Ne of the engine 22 inputted in Step S100 by the following formula (6), and the torque command Tm1* of the motor MG1 is set for causing the rotation speed Ne of the engine 22 to reach the target rotation speed Ne* (=Ne0) with the firing being continued (Step S260). The formula (6) is a relational expression in feedback control for causing the rotation speed Ne of the engine 22 to reach the target rotation speed Ne* with the firing being continued. In the formula (6), "k1" in the first term on the right side is a gain of a proportional term, and "k2" in the second term on the right side is a gain of an integral term. To continue the firing of the engine 22, the gains k1 and k2 are set to smaller values than when relatively high torque is outputted from the engine 22.

Figure 9:
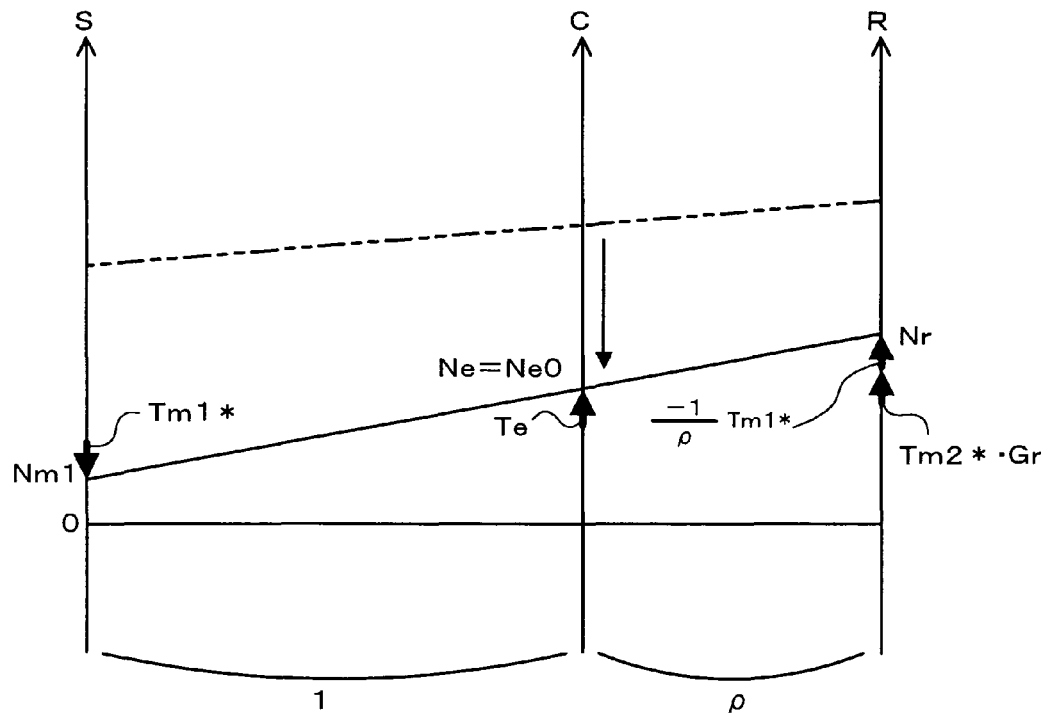
FIG. 9 is an alignment chart illustrating a dynamic relationship between a rotation speed and torque of each rotating element of the power distribution and integration mechanism 30 when firing of the engine 22 is continued in the accelerator-on state.

The torque command Tm1* is thus set, and then the torque command Tm2* of the motor MG2 is set using the set torque command Tm1* (Steps S190 to S210), the engine commands (the firing command and the target rotation speed Ne*) are transmitted to the engine ECU 24, the torque commands Tm1* and Tm2* are transmitted to the motor ECU 40 (Step S220), and the routine is once finished. For continuing the firing of the engine 22 when the deceleration demand is made in the accelerator-on state, the motor MG1 is driven and controlled as described above, thereby allowing the rotation speed Ne of the engine 22 to be quickly reduced to the target rotation speed Ne* (=Ne0) without fuel cut, and allowing deceleration of the hybrid vehicle 20. In this case, the engine ECU 24 sets the opening of the throttle valve 124 to a low value so as to ensure intake air in an amount that causes no misfire. FIG. 9 is an alignment chart illustrating a dynamic relationship between a rotation speed and torque of each rotating element of the power distribution and integration mechanism 30 when firing of the engine 22 is continued in the accelerator-on state. As is seen from FIG. 9, when the engine 22 is operated at the rotation speed Ne0, slight driving torque is outputted from the engine 22, and the driving torque is applied to the ring gear shaft 32a as the output shaft. Thus, the motor MG2 outputs torque obtained by subtracting the driving torque from the torque based on the torque demand (braking torque) Tr*.

$$Tm1^* = k1 \cdot (Ne^* - Ne) + k2 \int (Ne^* - Ne) \cdot dt \qquad (6)$$

Figure 10:
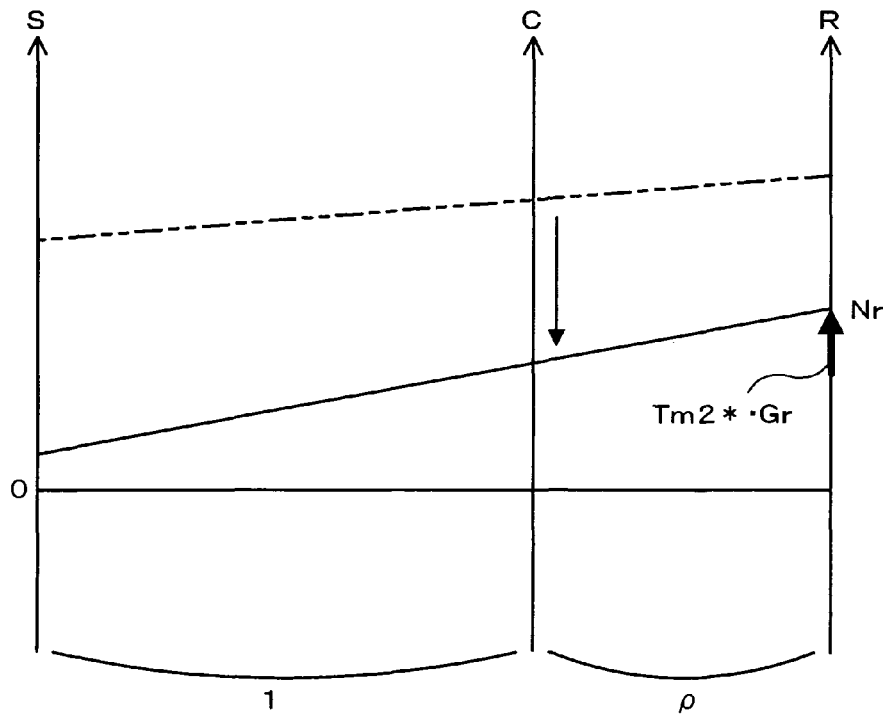
FIG. 10 is an alignment chart illustrating a dynamic relationship between a rotation speed and torque of each rotating element of the power distribution and integration mechanism 30 when fuel cut is performed in the accelerator-on state.

If the firing of the engine 22 is continued when the accelerator opening Acc is suddenly reduced in the accelerator-on state with the vehicle speed V being high as shown by the dash-double-dot line in FIG. 9, the rotation speed of the engine 22 needs to be abruptly reduced to the target rotation speed Ne0 by the motor MG1, which increases electric power regenerated by the motor MG1. Thus, depending on the state of charge SOC of the battery 50 or the value of the input limit Win of the battery 50 set based on the state of charge SOC, there is a possibility that the electric power regenerated by the motor MG1 cannot be accumulated in the battery 50 when the engine 22 substantially performs the self-sustaining operation without the fuel cut. Thus, when it is determined in Step S230 that the state of charge SOC of the battery 50 is less than the upper limit value SOC1, or it is determined in Step S240 that the input limit Win of the battery 50 is less than the charge limit value Win1 as the charging electric power, it is determined that the fuel cut cannot be prohibited, and a command for performing the fuel cut for temporarily stopping fuel injection to the engine 22 is set (Step S270), and the torque command Tm1* of the motor MG1 is set to zero (Step S280). Then, the torque command Tm2* of the motor MG2 is set using the set torque command Tm1* (=0) (Steps S190 to S210), the engine command (fuel cut command) is transmitted to the engine ECU 24, and the torque commands Tm1* and Tm2* are transmitted to the motor ECU 40 (Step S220), and the routine is once finished. The fuel cut is thus performed to allow the rotation speed of the engine 22 to be quickly reduced and allow deceleration of the hybrid vehicle 20. FIG. 10 is an alignment chart illustrating a dynamic relationship between a rotation speed and torque of each rotating element of the power distribution and integration mechanism 30 when the fuel cut is performed in the accelerator-on state.

As described above, in the hybrid vehicle 20 of the embodiment, when the deceleration demand in the accelerator-on state is made in the state where the shift position SP is set to the S position and arbitrary selection (manual selection) of the shift positions SP1 to SP6 that define settable ranges of the torque demand Tr* required for driving is allowed, and it is determined that the fuel cut cannot be prohibited based on the state of the battery 50, that is, the state of charge SOC and the input limit Win, the engine 22 and the motors MG1 and MG2 are controlled so that the driving force based on the set torque demand Tr* is outputted with the fuel cut of the engine 22 (Steps S270, S280, S190 to S220). When the deceleration demand in the accelerator-on state is made in the state where the shift position SP is set to the S position, and it is determined that the fuel cut can be prohibited based on the state of charge SOC and the input limit Win of the battery 50, the engine 22 and the motors MG1 and MG2 are controlled so that the engine 22 substantially performs the self-sustaining operation at the target rotation speed Ne0 and the driving force based on the set torque demand Tr* is outputted (Steps S250, S260, S190 to S220).

Figure 11:
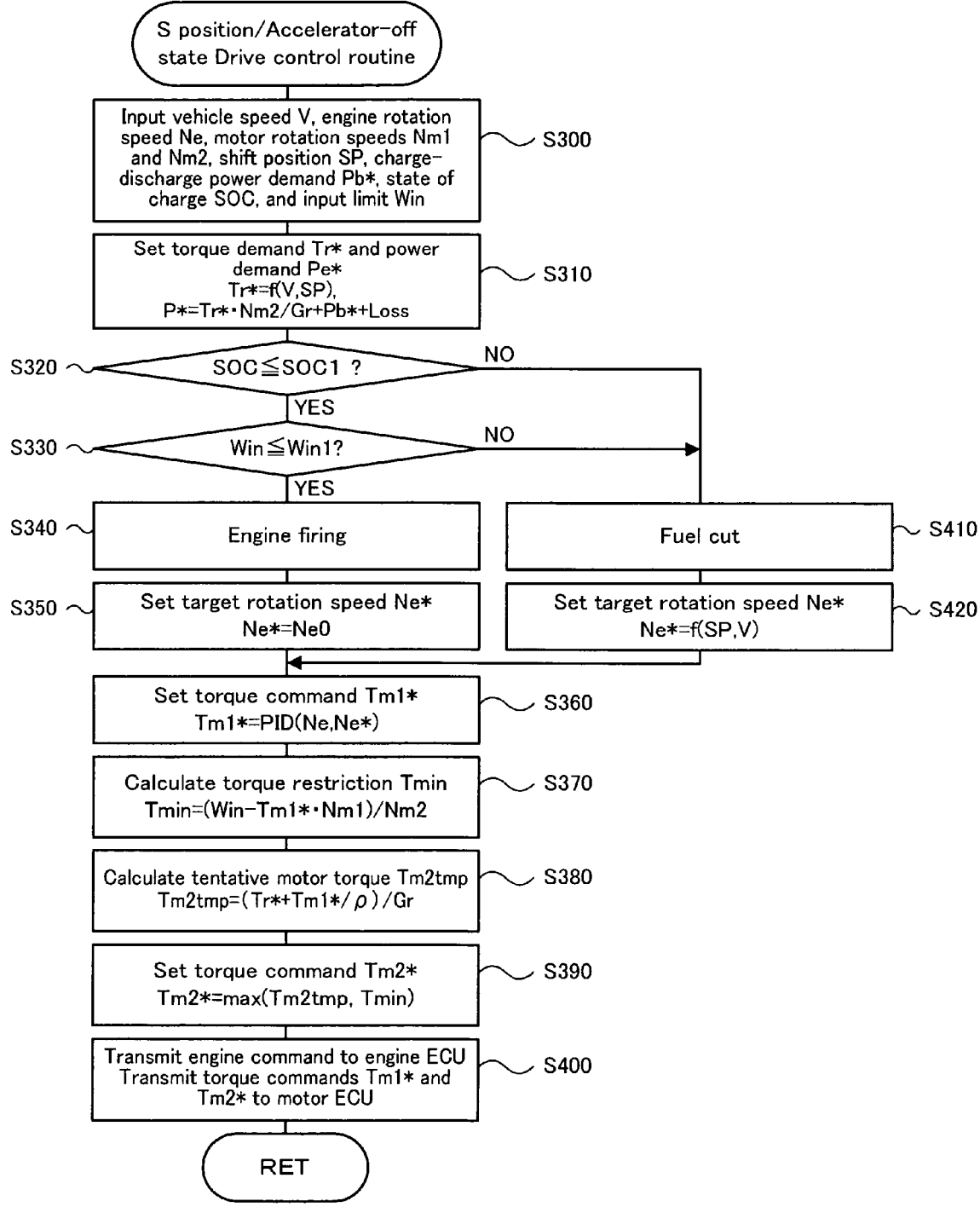
FIG. 11 is a flowchart showing an example of a drive control routine performed by the hybrid electric control unit 70 in the embodiment when the S position is selected as the shift position SP and the accelerator operation state is an accelerator-off state.

Next, operation of the hybrid vehicle 20 will be described when the driver selects the S position as the shift position SP, and the accelerator operation state is the accelerator-off state. FIG. 11 is a flowchart showing an example of a drive control routine performed by the hybrid ECU 70 when the driver selects the S position as the shift position SP and the accelerator operation state is the accelerator-off state. This routine is also repeatedly performed every predetermined time (for example, every few milliseconds) when the accelerator operation state is the accelerator-off state. When the drive control routine in FIG. 11 is started, the CPU 72 of the hybrid ECU 70 first performs a processing for inputting data required for control such as the vehicle speed V from the vehicle speed sensor 88, the rotation speeds Nm1 and Nm2 of the motors MG1 and MG2, the shift position SP from the shift position sensor 82, the charge-discharge power demand Pb* to be charged and discharged by the battery 50, the state of charge (SOC) of the battery 50, and the input limit Win of the battery 50 (Step S300). The input procedure of each data is the same as in the routine in FIG. 3. After the data input processing in Step S300, the torque demand (braking torque) Tr* to be outputted to the ring gear shaft 32a as the drive shaft connected to the drive wheels 63a and 63b, and the power demand P* required for the entire vehicle in driving are set based on the vehicle speed V and the shift position SP (Step S310). In the embodiment, the torque demand Tr* is set by deriving the torque demand Tr* when the accelerator opening Acc corresponding to the vehicle speed V and the shift position SP is 0%, from the torque demand setting map in FIG. 6. The power demand P* is set as in the routine in FIG. 3. Then, it is determined whether the state of charge SOC of the battery 50 inputted in Step S300 is the predetermined upper limit value SOC1 or less (Step S320). When the state of charge SOC is the upper limit value SOC1 or less, it is determined whether the input limit Win of the battery 50 inputted in Step S300 is the predetermined charge limit value Win1 or less (Step S330). The upper limit value SOC1 and the charge limit value Win1 are the same as those in the routine in FIG. 3.

When the state of charge SOC is the upper limit value SOC1 or less, and the input limit Win of the battery 50 is the charge limit value Win1 or less, a command for continuing the firing of the engine 22 is set as an engine command (Step S340), and the target rotation speed Ne* of the engine 22 is set to a rotation speed Ne0 at the time of continuation of the firing so that the engine 22 substantially performs the self-sustaining operation without any output of the torque (Step S350). The rotation speed Ne0 is, for example, a rotation speed (800 to 1000 rpm) in idling as in the routine in FIG. 3. Then, calculation is performed based on the set target rotation speed Ne* (=Ne0) and the rotation speed Ne of the engine 22 inputted in Step S300 by the following formula (6), and the torque command Tm1* of the motor MG1 is set for causing the rotation speed Ne of the engine 22 to reach the target rotation speed Ne* (=Ne0) with the firing being continued (Step S360). When the torque command Tm1* is set, a deviation between the input limit Win of the battery 50 inputted in Step S300 and power consumption of the motor MG1 obtained by multiplying the set torque command Tm1* of the motor MG1 by the present rotation speed Nm1 of the motor MG1 is divided by the rotation speed Nm2 of the motor MG2 to calculate a torque restriction Tmin as a lower limit of torque that may be outputted from the motor MG2 (Step S370). Further, tentative motor torque Tm2tmp as torque to be outputted from the motor MG2 is calculated using the torque demand Tr*, the torque command Tm1*, the gear ratio ρ of the power distribution and integration mechanism 30, and the gear ratio Gr of the reduction gear 35 as in Step 200 in the routine in FIG. 3 (Step S380), and the calculated tentative motor torque Tm2tmp is restricted by the torque restriction Tmin to set a torque command Tm2* of the motor MG2 (Step S390). The torque command Tm2* of the motor MG2 is thus set to allow the torque demand Tr* outputted to the ring gear shaft 32a to be set as torque basically restricted by the input limit Win of the battery 50. The engine command (the firing command and the target rotation speed Ne*) and the torque commands Tm1* and Tm2* of the motors MG1 and MG2 are set, and then the engine commands are transmitted to the engine ECU 24, the torque commands Tm1* and Tm2* of the motors MG1 and MG2 are transmitted to the motor ECU 40 (Step S400), and the routine is once finished.

Figure 12:
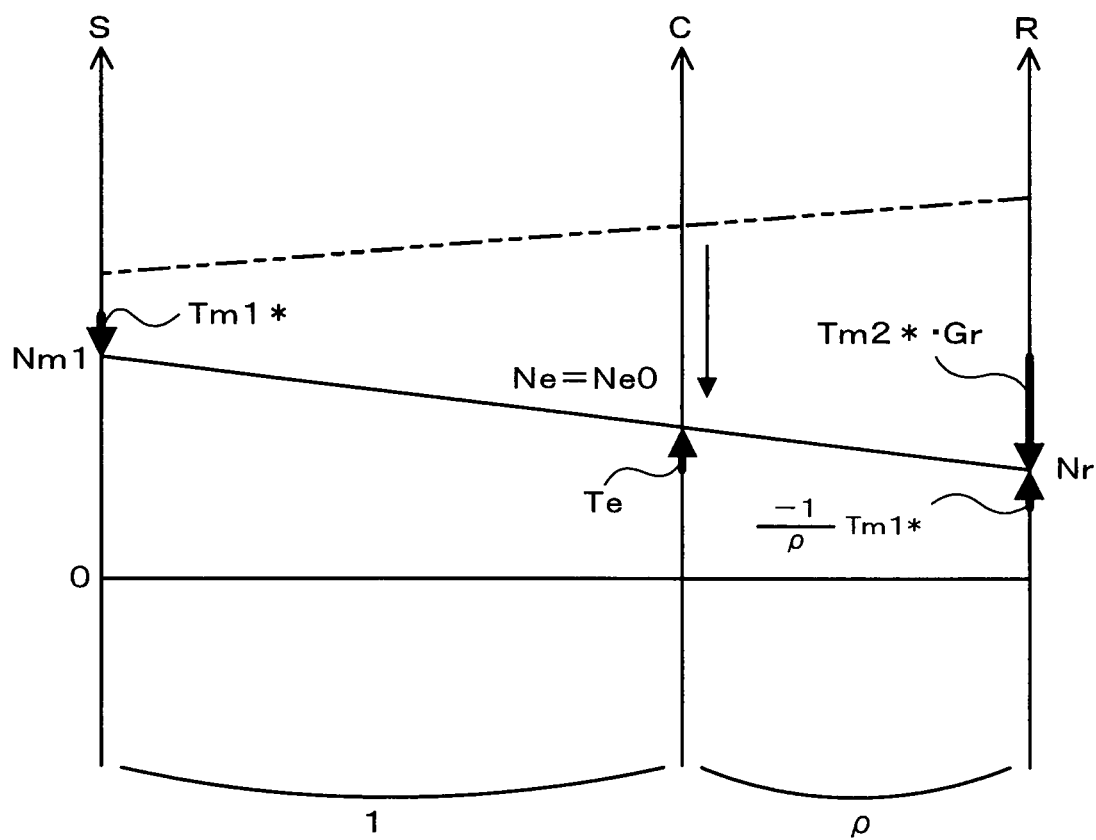
FIG. 12 is an alignment chart illustrating a dynamic relationship between a rotation speed and torque of each rotating element of the power distribution and integration mechanism 30 when firing of the engine 22 is continued in the accelerator-off state.

For continuing the firing of the engine 22 when the deceleration demand based on accelerator-off is made, the motors MG1 and MG2 are driven and controlled as described above, thereby allowing the rotation speed Ne of the engine 22 to be quickly reduced to the target rotation speed Ne* (=Ne0) without fuel cut, and allowing a braking force to be generated by regeneration of the motor MG2 to decelerate the hybrid vehicle 20. Also in this case, the engine ECU 24 sets the opening of the throttle valve 124 to a low value so as to ensure intake air in an amount that causes no misfire. FIG. 12 is an alignment chart illustrating a dynamic relationship between a rotation speed and torque of each rotating element of the power distribution and integration mechanism 30 when the firing of the engine 22 is continued in the accelerator-off state. When the engine 22 is operated at the rotation speed Ne0 in the accelerator-off state, slight driving torque is outputted from the engine 22 to the ring gear shaft 32a as the output shaft as shown in FIG. 12, and thus the motor MG2 outputs the sum of torque based on the torque demand (braking torque) Tr* and torque for canceling the driving torque.

Also in the accelerator-off state, if the firing of the engine 22 is continued when the accelerator opening Acc is suddenly reduced in the accelerator-on state with the vehicle speed V being high as shown by the dash-double-dot line in FIG. 12, the rotation speed of the engine 22 needs to be abruptly reduced to the target rotation speed Ne0 by the motor MG1, which increases electric power regenerated by the motor MG1. As is seen from FIG. 6, in the accelerator-off state, the set torque demand Tr* increases as the braking force with increasing vehicle speed or lowering shift position SP (toward the SP1 side), and thus the regenerative braking force required for the motor MG2 increases, which increases electric power inputted from the motor MG2 to the battery 50. Thus, depending on the state of charge SOC of the battery 50 or the value of the input limit Win of the battery 50 set based on the state of charge SOC, there is a possibility that the electric power regenerated by the motor MG1 cannot be accumulated in the battery 50 when the engine 22 substantially performs the self-sustaining operation without the fuel cut.

Figure 13:
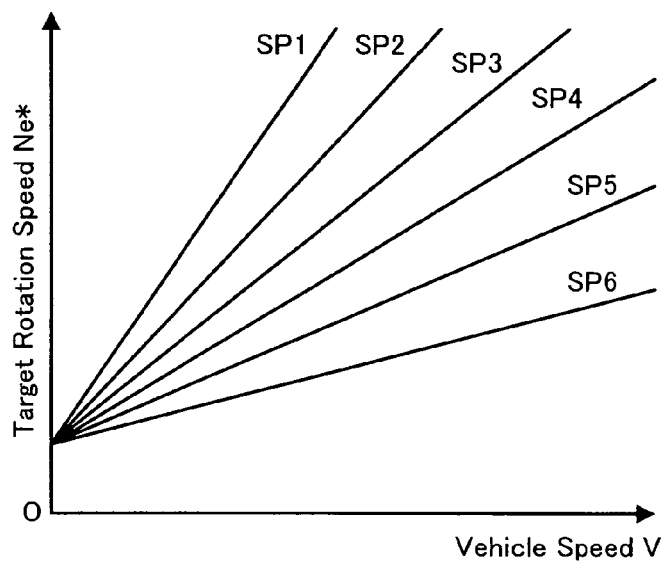
FIG. 13 illustrates an example of a target rotation speed setting map used in selecting the S position.
Figure 14:
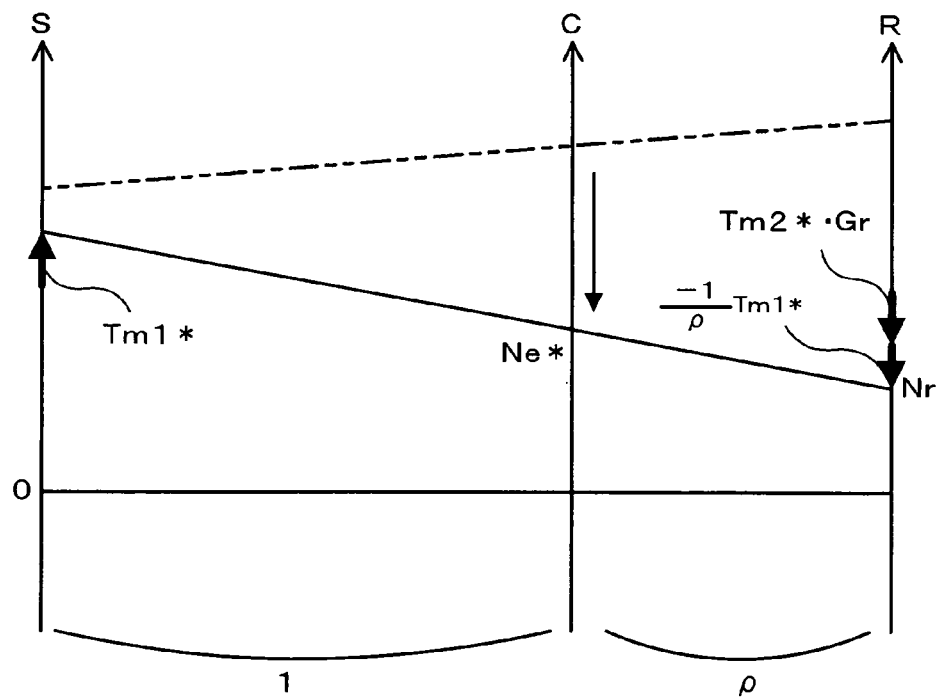
FIG. 14 is an alignment chart illustrating a dynamic relationship between a rotation speed and torque of each rotating element of the power distribution and integration mechanism 30 when fuel cut is performed in the accelerator-off state.

Thus, when it is determined in Step S320 that the state of charge SOC of the battery 50 is less than the upper limit value SOC1, or it is determined in Step S330 that the input limit Win of the battery 50 is less than the charge limit value Win1 as the charging electric power, it is determined that the fuel cut cannot be prohibited, and a command for performing the fuel cut for temporarily stopping fuel injection to the engine 22 is set (Step S410), and the target rotation speed Ne* of the engine 22 is set based on the shift position SP and the vehicle speed V so that the engine brake provides part of the braking force (Step S420). In the embodiment, for the selection of the S position, the relationship between the shift positions SP including SP1 to SP6, the vehicle speed V, and the target rotation speed Ne* of the engine 22 is previously determined, and stored in the ROM 74 as the target rotation speed setting map as an operation point constraint in selecting the S position, and when the shift position SP and the vehicle speed V are provided, the target rotation speed Ne* of the engine 22 corresponding to the shift position SP and the vehicle speed V is derived from the map and set. FIG. 13 illustrates an example of the target rotation speed setting map used in selecting the S position. The target rotation speed Ne* of the engine 22 is thus set, then the processings in Steps S360 to S400 described above are performed, and the routine is once finished. Thus, the fuel cut is performed when the deceleration demand based on the accelerator-off is made, and the motors MG1 and MG2 are driven and controlled as described above, thereby allowing braking torque (direct torque=−1/ρ·Tm1*) by the engine brake from the engine 22 and the braking force by regeneration of the motor MG2 to be outputted to the ring gear shaft 32a as the drive shaft, and thus reducing electric power inputted to the battery 50 by the regeneration of the motor MG2. Particularly, when the vehicle speed V is relatively high and the shift position SP is on the lower side, relatively high braking torque is set as the torque demand as is seen from FIG. 6, and the target rotation speed Ne* of the engine 22 is set to a relatively high value as is seen from FIG. 13, and the rotation speed of the engine 22 is maintained at the high value by motoring of the motor MG1 to the like, thereby reducing the load on the motor MG2. FIG. 14 is an alignment chart illustrating a dynamic relationship between a rotation speed and torque of each rotating element of the power distribution and integration mechanism 30 when the fuel cut is performed in the accelerator-off state.

As described above, in the hybrid vehicle 20 of the embodiment, when the deceleration demand based on the accelerator-off is made in the state where the shift position SP is set to the S position and arbitrary selection of the shift positions SP1 to SP6 is allowed, and it is determined that the fuel cut cannot be prohibited based on the state of the battery 50, that is, the state of charge SOC and the input limit Win, the engine 22 and the motors MG1 and MG2 are controlled so that the driving force based on the set torque demand Tr* is outputted with the fuel cut of the engine 22 (Steps S410, S420, S360 to S400). When the deceleration demand in the accelerator-off state is made in the state where the shift position SP is set to the S position, and it is determined that the fuel cut can be prohibited based on the state of charge SOC and the input limit Win of the battery 50, the engine 22 and the motors MG1 and MG2 are controlled so that the engine 22 substantially performs the self-sustaining operation at the target rotation speed Ne0 and the driving force based on the set torque demand Tr* is outputted (Steps S340 to S400).

As described above, in the hybrid vehicle 20 of the embodiment, when the deceleration demand in the accelerator-on state or the deceleration demand based on the accelerator-off is made in the state where the shift position SP is set to the S position and arbitrary selection of the shift positions SP1 to SP6 is allowed, the driving force (braking force) based on the torque demand Tr* is obtained with the substantial self-sustaining operation of the engine 22 without the fuel cut except the case where the fuel cut has to be prohibited based on the state of the battery 50, that is, the state of charge SOC and the input limit Win. Specifically, when the driver is allowed to arbitrarily select the shift positions SP1 to SP6, and the deceleration demand in the accelerator-on state due to the sudden reduction in the accelerator opening Acc or the deceleration demand based on the accelerator-off is made, the fuel cut is generally performed, thus a large amount of air is fed to the exhaust gas purifying catalyst in the purifying device 134, and thus oxygen may attach to the catalyst to reduce NOx purifying performance. Thus, the driving force (braking force) based on the torque demand Tr* is obtained with the substantial self-sustaining operation of the engine 22 without the fuel cut except the case where the fuel cut has to be prohibited from the state of the battery 50. This can prevent a reduction in purifying performance of the exhaust gas purifying catalyst caused by a large amount of air being fed to the purifying device 134 because of the fuel cut, and thus improve emission.

As described above, the upper limit value SOC1 and the charge limit value Win1 as the thresholds are determined based on the electric power inputted and outputted by the motors MG1 and MG2 when the torque demand Tr* at the time of deceleration demand is obtained with the substantial self-sustaining operation of the engine 22 without the fuel cut, and it is determined that the fuel cut can be prohibited when the state of charge SOC of the battery 50 is the upper limit value SOC1 or less, or the input limit Win as the charging allowable electric power set based on the state of the battery 50 is the charge limit value Win1 or less. Thus, it can be properly determined whether the fuel cut can be prohibited based on the state of the battery, and the prohibition of the fuel cut can be canceled at proper timing to prevent degradation by overcharge of the battery 50.

The hybrid vehicle 20 of the embodiment has been described in which the shift positions of the shift lever 81 include the S position that allows the driver to arbitrarily select the shift positions SP1 to SP6, but the present invention is not restrictively applied to this. Specifically, in the case where the shift positions SP of the shift lever 81 include a brake position that is selected, for example, in driving on a downhill at a relatively high speed, and has a settable range of a driving force corresponding thereto having a lower limit of a power range lower than in the D position, the drive control routine in FIG. 3 or 11 may be performed when the brake position is selected.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

Specifically, in the hybrid vehicle 20 of the embodiment, the ring gear shaft 32a as the drive shaft and the motor MG2 are connected via the reduction gear 35 that reduces the rotation speed of the motor MG2 and transmits the rotation speed to the ring gear shaft 32a. However, instead of the reduction gear 35, for example, a transmission may be used that has two transmission stages of High and Low or three or more transmission stages, and changes the rotation speed of the motor MG2 and transmits the rotation speed to the ring gear shaft 32a.

Figure 15:
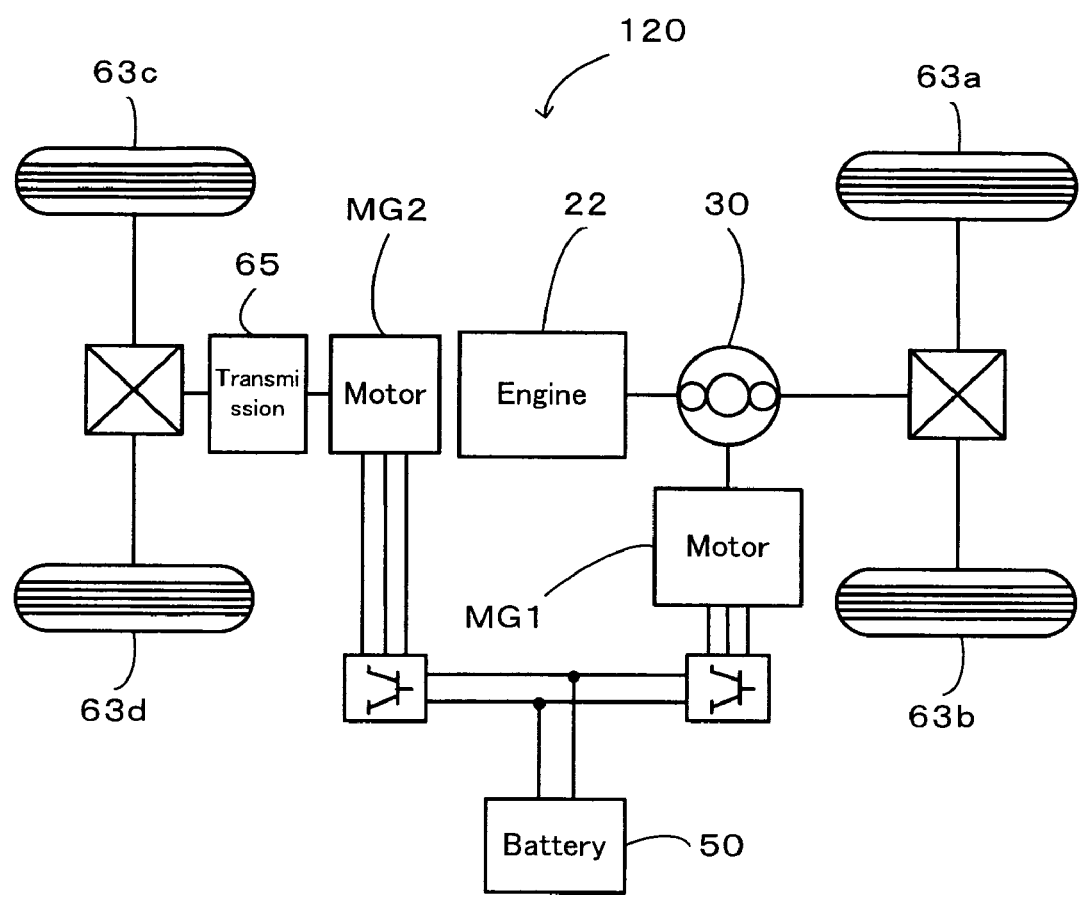
FIG. 15 is a schematic block diagram of a hybrid vehicle 120 according to a variant.

In the hybrid vehicle 20 of the embodiment, the power of the motor MG2 is decelerated by the reduction gear 35 and outputted to the ring gear shaft 32a. However, as a hybrid vehicle 120 of a variant shown in FIG. 15, power of a motor MG2 may be changed in speed by a transmission 65 and transmitted to an axle (an axle connected to wheels 63c and 63d in FIG. 15) different from an axle connected to a ring gear shaft 32a (an axle connected to drive wheels 63a and 63b).

Figure 16:
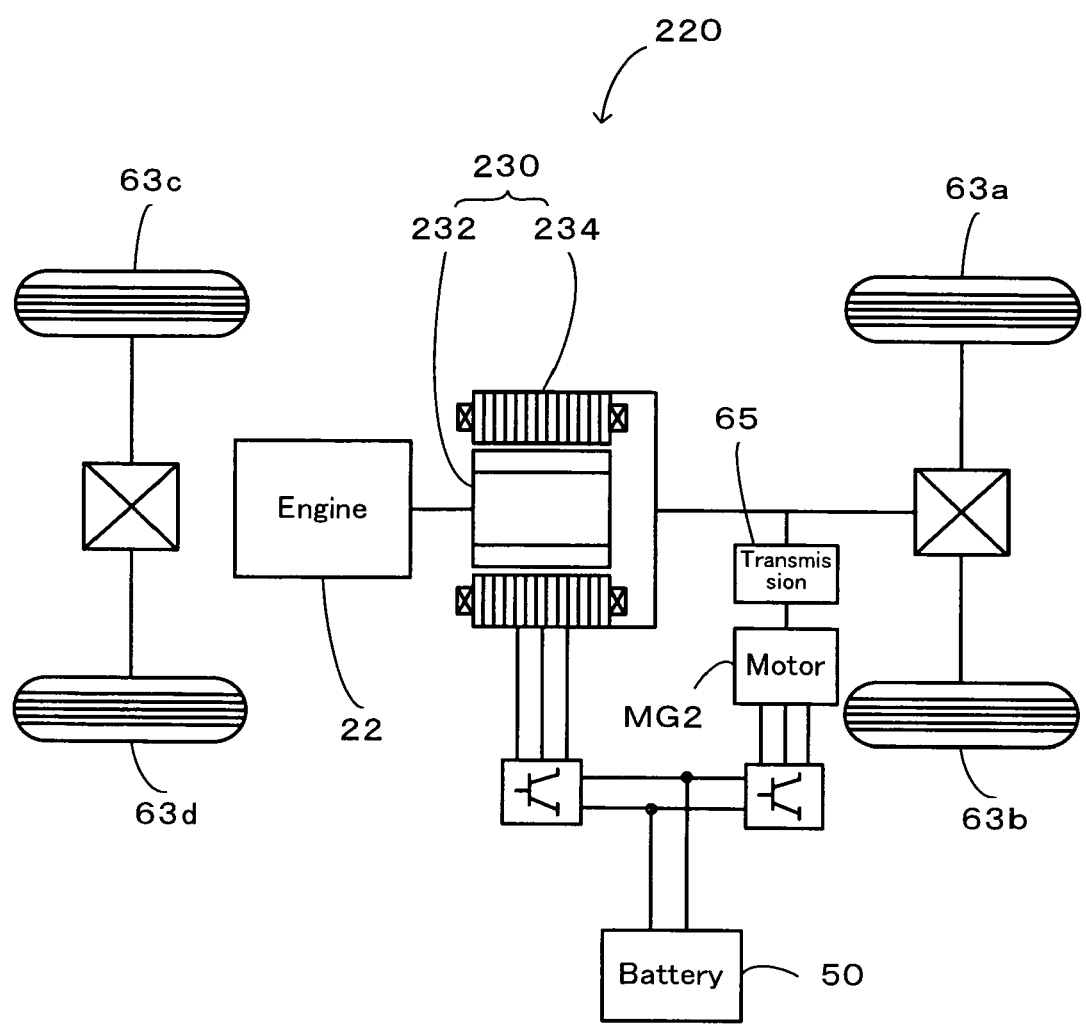
FIG. 16 is a schematic block diagram of a hybrid vehicle 220 according to a variant.

In the hybrid vehicle 20 and 20B of the embodiment, the power of the engine 22 is output via the power distribution integration mechanism 30 to the ring gear shaft 32a functioning as the drive shaft linked with the drive wheels 63a and 63b. In another possible modification of FIG. 16, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

INDUSTRIAL APPLICABILITY

The present invention is applicable in production industries of vehicles.

The invention claimed is:

1. A hybrid vehicle comprising:
an internal combustion engine;
a purifying unit including a catalyst for purifying exhaust gas exhausted from said internal combustion engine;
an electric power-mechanical power input output mechanism that is connected to a first axle that is any one of axles and an output shaft of said internal combustion engine and can input and output power to said first axle and said output shaft with input and output of electric power and mechanical power;
an electric motor that can input and output power to said first axle or a second axle that is any one of axles different from said first axle;
an accumulator unit that can supply and receive electric power to and from said electric power-mechanical power input output mechanism and said electric motor;
a fuel supply stop determination module that determines whether a stop of fuel supply to said internal combustion engine can be prohibited based on a state of said accumulator unit;
an operation condition setting module that sets any one of a plurality of operation conditions that define, in different manners, settable ranges of a required driving force at least required for driving as an operation condition for execution, and allows a driver to select an arbitrary operation condition under a predetermined condition;
a required driving force setting module that sets the required driving force according to said set operation condition for execution; and
a control unit that controls said internal combustion engine, said electric power-mechanical power input output mechanism, and said electric motor so that a driving force based on said set required driving force is outputted with the stop of said fuel supply, when a deceleration demand is made in a state where said operation condition setting module allows selection of said arbitrary operation condition, and said fuel supply stop determination module determines that the stop of said fuel supply cannot be prohibited, and controls said internal combustion engine, said electric power-mechanical power input output mechanism, and said electric motor so that said internal combustion engine substantially performs self-sustaining operation at a predetermined rotation speed and a driving force based on said set required driving force is outputted, when said deceleration demand is made and said fuel supply stop determination module determines that the stop of said fuel supply can be prohibited.

2. A hybrid vehicle according to claim 1, wherein said deceleration demand includes a deceleration demand due to an accelerator operation state being an accelerator-off state, and a deceleration demand due to the accelerator operation state staying in an accelerator-on state and an accelerator opening being reduced.

3. A hybrid vehicle according to claim 1, wherein said fuel supply stop determination module determines that the stop of said fuel supply can be prohibited when an amount of charge left in said accumulator unit is a predetermined upper limit value or less, or when charging allowable electric power that is electric power allowed for charging said accumulator unit and is set based on the state of said accumulator unit is a predetermined charge limit value or less.

4. A hybrid vehicle according to claim 3, wherein said upper limit value and said charge limit value are determined based on electric power inputted and outputted by said electric power-mechanical power input output mechanism and said electric motor when the required driving force at the time of the deceleration demand is obtained with the substantial self-sustaining operation of said internal combustion engine without the stop of the fuel supply.

5. A hybrid vehicle according to claim 1, wherein said operation condition setting module is a shift setting module that sets a shift position for execution among a plurality of shift positions according to a driver's shift operation, said plurality of operation conditions correspond to said plurality of shift positions, and said plurality of shift positions include a sequential shift position that allows the driver to select an arbitrary shift position.

6. A hybrid vehicle according to claim 5, wherein an operation condition that the driver is allowed to select when said sequential shift position is selected defines a settable range of said required driving force and an operation point constraint for determining a target rotation speed of said internal combustion engine corresponding to said required driving force, and said control unit controls said internal combustion engine, said electric power-mechanical power input output mechanism, and said electric motor so that said internal combustion engine is operated at the target rotation speed set based on said operation point constraint and a driving force based on said set required driving force is outputted with the stop of said fuel supply, when said deceleration demand is made and said fuel supply stop determination module determines that the stop of said fuel supply cannot be prohibited.

7. A hybrid vehicle according to claim 1, wherein said electric power-mechanical power input output mechanism includes a three shaft-type power input output module that is connected to said first axle, the output shaft of said internal combustion engine, and a rotatable third shaft, and inputs and outputs power determined based on power inputted and outputted to any two shafts among the three shafts to a remaining shaft, and a generator that can input and output power to said third shaft.

8. A control method of a hybrid vehicle including:
an internal combustion engine;
a purifying unit including a catalyst for purifying exhaust gas exhausted from said internal combustion engine;
an electric power-mechanical power input output mechanism that is connected to a first axle that is any one of axles and an output shaft of said internal combustion engine and can input and output power to said first axle and said output shaft with input and output of electric power and mechanical power;
an electric motor that can input and output power to said first axle or a second axle that is any one of axles different from said first axle;
an accumulator unit that can supply and receive electric power to and from said electric power-mechanical power input output mechanism and said electric motor; and
an operation condition setting module that sets any one of a plurality of operation conditions that define, in different manners, driving force setting constraints for determining ranges of a required driving force at least required for driving as an operation condition for execution, and allows a driver to select an arbitrary operation condition under a predetermined condition, said control method comprising the step of:
(a) controlling said internal combustion engine, said electric power-mechanical power input output mechanism, and said electric motor so that a driving force based on the required driving force set according to said set operation condition for execution is outputted with the stop of the fuel supply to said internal combustion engine, when a deceleration demand is made in a state where said operation condition setting module allows selection of said arbitrary operation condition, and the stop of the fuel supply to said internal combustion engine cannot be prohibited from a state of said accumulator unit, and controlling said internal combustion engine, said electric power-mechanical power input output mechanism, and said electric motor so that said internal combustion engine substantially performs self-sustaining operation at a predetermined rotation speed and a driving force based on the required driving force set according to said set operation condition for execution is outputted, when said deceleration demand is made and the stop of said fuel supply can be prohibited from the state of said accumulator unit.

9. A control method of a hybrid vehicle according to claim 8, wherein said deceleration demand includes a deceleration demand due to an accelerator operation state being an accelerator-off state, and a deceleration demand due to the accelerator operation state staying in an accelerator-on state and an accelerator opening being reduced.

10. A control method of a hybrid vehicle according to claim 8, said control method further comprising the step of:
(b) determining whether the stop of the fuel supply to said internal combustion engine can be prohibited based on the state of said accumulator unit,
wherein said step (b) includes determining that the stop of said fuel supply can be prohibited when an amount of charge left in said accumulator unit is a predetermined upper limit value or less, or when charging allowable electric power that is electric power allowed for charging said accumulator unit and is set based on the state of said accumulator unit is a predetermined charge limit value or less.

11. A control method of a hybrid vehicle according to claim 10, wherein said upper limit value and said charge limit value are determined based on electric power inputted and outputted by said electric power-mechanical power input output mechanism and said electric motor when the required driving force at the time of the deceleration demand is obtained with the substantial self-sustaining operation of said internal combustion engine without the stop of the fuel supply.

12. A control method of a hybrid vehicle according to claim 8, wherein said operation condition setting module is a shift setting module that sets a shift position for execution among a plurality of shift positions according to a driver's shift operation, said plurality of operation conditions correspond to said plurality of shift positions, and said plurality of shift positions include a sequential shift position that allows the driver to select an arbitrary shift position.

13. A control method of a hybrid vehicle according to claim 12, wherein an operation condition that the driver is allowed to select when said sequential shift position is selected defines a settable range of said required driving force and an operation point constraint for determining a target rotation speed of said internal combustion engine corresponding to said required driving force, and said step (a) includes controlling said internal combustion engine, said electric power-mechanical power input output mechanism, and said electric motor so that said internal combustion engine is operated at the target rotation speed set based on said operation point constraint and a driving force based on said set required driving force is outputted with the stop of said fuel supply, when said deceleration demand is made and said fuel supply stop determination module determines that the stop of said fuel supply cannot be prohibited.

* * * * *